(12) United States Patent
Yu et al.

(10) Patent No.: US 11,714,262 B2
(45) Date of Patent: Aug. 1, 2023

(54) CAMERA OPTICAL LENS

(71) Applicant: AAC Optics (Changzhou) Co., Ltd., Changzhou (CN)

(72) Inventors: Dong Yu, Shenzhen (CN); Wanxia Li, Shenzhen (CN); Yanan Wang, Shenzhen (CN)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 326 days.

(21) Appl. No.: 17/134,531

(22) Filed: Dec. 28, 2020

(65) Prior Publication Data

US 2022/0019058 A1    Jan. 20, 2022

(30) Foreign Application Priority Data

Jul. 20, 2020   (CN) .......................... 202010695365.6

(51) Int. Cl.
*G02B 9/60* (2006.01)
*G02B 13/00* (2006.01)

(52) U.S. Cl.
CPC ........... *G02B 9/60* (2013.01); *G02B 13/0045* (2013.01)

(58) Field of Classification Search
None
See application file for complete search history.

(56) References Cited

U.S. PATENT DOCUMENTS

| | | | | |
|---|---|---|---|---|
| 8,305,697 B1* | 11/2012 | Chen | .................. | G02B 13/0045 359/764 |
| 8,325,429 B2* | 12/2012 | Tang | .................. | G02B 13/0045 359/764 |
| 8,917,458 B2* | 12/2014 | Tsai | .................... | G02B 13/0045 359/764 |
| 11,372,213 B2* | 6/2022 | Sun | .................... | G02B 13/0045 |
| 2014/0153113 A1* | 6/2014 | Tsai | ......................... | G02B 9/62 359/713 |
| 2019/0250372 A1* | 8/2019 | Oinuma | .................... | G02B 9/62 |

\* cited by examiner

*Primary Examiner* — Darryl J Collins
(74) *Attorney, Agent, or Firm* — W&G Law Group

(57) ABSTRACT

A camera optical lens includes first to fifth lenses from an object side to an image side, which are first and fourth lenses having positive refractive power, and second, third and fifth lenses having negative refractive power. The camera optical lens satisfies $0.90 \leq f1/f \leq 1.30$; $-5.00 \leq f3/f \leq -2.50$; $10.00 \leq d1/d2 \leq 25.00$; and $0 \leq (R7+R8)/(R7-R8) \leq 0.90$, where f, f1 and f3 respectively denote focal lengths of the camera optical lens, the first lens, and the third lens, R7 denotes a curvature radius of an object side surface of the fourth lens, R8 denotes a curvature radius of an image side surface of the fourth lens, d1 denotes an on-axis thickness of the first lens, and d2 denotes an on-axis distance from an image side surface of the first lens to an object side surface of the second lens. The camera optical lens has good optical performance and satisfies design requirements of a large angle, a wide angle and ultra-thinness.

10 Claims, 15 Drawing Sheets

CAMERA OPTICAL LENS

TECHNICAL FIELD

The present invention relates to the field of optical lenses, and more particularly, to a camera optical lens suitable for portable terminal devices such as smart phones and digital cameras, as well as camera devices such as monitors and PC lenses.

BACKGROUND

With the development of camera technology, camera optical lenses are widely used in various electronic products, such as smart phones, digital cameras, etc. In order to facilitate portability, people have higher and higher requirements on thinner and lighter electronic products. Therefore, a miniaturized camera optical lens having good imaging quality has become a mainstream of the current market.

In order to obtain a better imaging quality, the camera lens traditionally mounted onto a mobile phone camera mostly adopts a structure including three lenses or four lenses. However, with the development of technology and increased diversified requirements from the users, in the situation where a pixel area of a photosensitive device gradually decreases and the requirement in the imaging quality gradually increases, a camera lens having a five-lens structure has gradually appeared in lens design. Although the conventional camera lens including five lenses already has a good optical performance, there is still some irrationality in terms of refractive power, a distance between lenses and shapes of the respective lenses. As a result, the lens structure having good optical performance cannot meet the design requirements of a large aperture, a wide angle and ultra-thinness.

Therefore, it is necessary to provide a camera optical lens that has good optical performance while meeting the design requirements of a large aperture, a wide angle and ultra-thinness.

SUMMARY

A purpose of the present invention is to provide a camera optical lens, aiming to solve the problems of insufficient wide angle and ultra-thinness of the conventional camera optical lens.

The technical schemes of the present invention are as follows.

In an embodiment, the present invention provides a camera optical lens, from an object side to an image side, a first lens having a positive refractive power, a second lens having a negative refractive power, a third lens having a negative refractive power, a fourth lens having a positive refractive power and a fifth lens having a negative refractive power. The camera optical lens satisfies following conditions: $0.90 \leq f1/f \leq 1.30$; $-5.00 \leq f3/f \leq -2.50$; $10.00 \leq d1/d2 \leq 25.00$; and $0 \leq (R7+R8)/(R7-R8) \leq 0.90$, where f denotes a focal length of the camera optical lens, f1 denotes a focal length of the first lens, f3 denotes a focal length of the third lens, R7 denotes a curvature radius of an object side surface of the fourth lens, R8 denotes a curvature radius of an image side surface of the fourth lens, d1 denotes an on-axis thickness of the first lens, and d2 denotes an on-axis distance from an image side surface of the first lens to an object side surface of the second lens.

In an improved embodiment, the camera optical lens further satisfies a following conditions: $2.00 \leq R9/R10 \leq 12.00$, where R9 denotes a curvature radius of an object side surface of the fifth lens, and R10 denotes a curvature radius of an image side surface of the fifth lens.

In an improved embodiment, the camera optical lens further satisfies following conditions: $-2.49 \leq (R1+R2)/(R1-R2) \leq -0.40$; and $0.14 \leq d1/TTL \leq 0.50$, where R1 denotes a curvature radius of an object side surface of the first lens, R2 denotes a curvature radius of the image side surface of the first lens, and TTL denotes a total optical length from the object side surface of the first lens to an image plane of the camera optical lens along an optic axis.

In an improved embodiment, the camera optical lens further satisfies following conditions: $-183.18 \leq f2/f \leq -1.88$; $-0.18 \leq (R3+R4)/(R3-R4) \leq 58.22$; and $0.02 \leq d3/TTL \leq 0.08$, where f2 denotes a focal length of the second lens, R3 denotes a curvature radius of the object side surface of the second lens, R4 denotes a curvature radius of an image side surface of the second lens, d3 denotes an on-axis thickness of the second lens, and TTL denotes a total optical length from an object side surface of the first lens to an image plane of the camera optical lens along an optic axis.

In an improved embodiment, the camera optical lens further satisfies following conditions: $-11.33 \leq (R5+R6)/(R5-R6) \leq 2.23$; and $0.02 \leq d5/TTL \leq 0.09$, where R5 denotes a curvature radius of an object side surface of the third lens, R6 denotes a curvature radius of an image side surface of the third lens, d5 denotes an on-axis thickness of the third lens, and TTL denotes a total optical length from an object side surface of the first lens to an image plane of the camera optical lens along an optic axis.

In an improved embodiment, the camera optical lens further satisfies following conditions: $0.33 \leq f4/f \leq 1.23$; and $0.05 \leq d7/TTL \leq 0.22$, where f4 denotes a focal length of the fourth lens, d7 denotes an on-axis thickness of the fourth lens, and TTL denotes a total optical length from an object side surface of the first lens to an image plane of the camera optical lens along an optic axis.

In an improved embodiment, the camera optical lens further satisfies following conditions: $-1.59 \leq f5/f \leq -0.37$; $0.59 \leq (R9+R10)/(R9-R10) \leq 4.49$; and $0.04 \leq d9/TTL \leq 0.14$, where f5 denotes a focal length of the fifth lens, R9 denotes a curvature radius of an object side surface of the fifth lens, R10 denotes a curvature radius of an image side surface of the fifth lens, d9 denotes an on-axis thickness of the fifth lens, and TTL denotes a total optical length from an object side surface of the first lens to an image plane of the camera optical lens along an optic axis.

In an improved embodiment, the camera optical lens further satisfies following conditions: $TTL/IH \leq 1.51$, where IH denotes an image height of the camera optical lens, and TTL denotes a total optical length from an object side surface of the first lens to an image plane of the camera optical lens along an optic axis.

In an improved embodiment, the camera optical lens further satisfies a following condition: $FOV \geq 81.00°$, where FOV denotes a field of view of the camera optical lens.

In an improved embodiment, the camera optical lens further satisfies a following condition: $0.59 \leq f12/f \leq 2.04$, where f12 denotes a combined focal length of the first lens and the second lens.

The present invention has at least the following beneficial effects. The camera optical lens provided by the present invention has good optical performance while satisfying the design requirements of a large angle, a wide angle and ultra-thinness, and is especially suitable for the mobile phone camera lens assembly and the WEB camera lens composed of imaging elements such as CCD and CMOS for high pixels.

BRIEF DESCRIPTION OF DRAWINGS

In order to more clearly illustrate technical solutions in embodiments of the present invention, the accompanying drawings used in the embodiments are briefly introduced as follows. It should be noted that the drawings described as follows are merely part of the embodiments of the present invention, and other drawings can also be acquired by those skilled in the art without paying creative efforts.

DESCRIPTION OF EMBODIMENTS

The present invention will hereinafter be described in detail with reference to several exemplary embodiments. To make the technical problems to be solved, technical solutions and beneficial effects of the present invention more apparent, the present invention is described in further detail together with the figures and the embodiments. It should be understood the specific embodiments described hereby is only to explain the invention, not intended to limit the invention.

Embodiment 1

Figure 1:
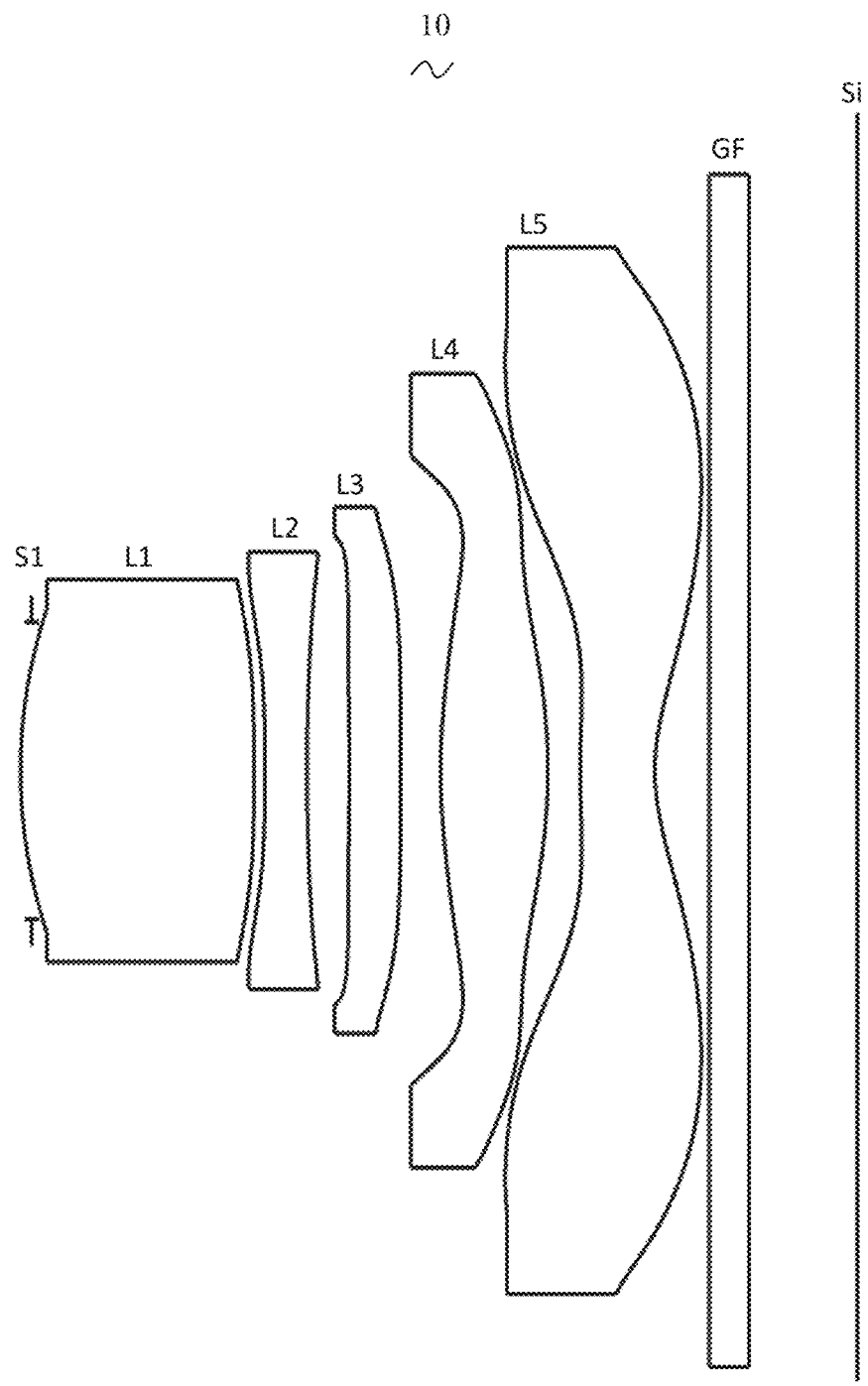
FIG. 1 is a schematic structural diagram of a camera optical lens according to Embodiment 1.

Please refer to FIG. 1 to FIG. 4, Embodiment 1 of the present invention provides a camera optical lens 10. As shown in FIG. 1, a left side is an object side, and a right side is an image side. The camera optical lens 10 mainly includes five lenses. Specifically, the camera optical lens 10 includes, from the object side to the image side, an aperture S1, a first lens L1, a second lens L2, a third lens L3, a fourth lens L4, and a fifth lens L5. A glass plate GF is provided between the fifth lens L5 and an image plane Si, and the glass plate GF may be a glass cover plate or an optical filter.

In this embodiment, the first lens L1 has a positive refractive power, the second lens L2 has a negative refractive power, the third lens L3 has a negative refractive power, the fourth lens L4 has a positive refractive power, and the fifth lens L5 has a negative refractive power.

In this embodiment, the first lens L1 is made of a plastic material, the second lens L2 is made of a plastic material, the third lens L3 is made of a plastic material, the fourth lens L4 is made of a plastic material, and the fifth lens L5 is made of a plastic material.

Herein, it is defined that a focal length of the camera optical lens 10 is denoted by f, a focal length of the first lens L1 is denoted by f1, a focal length of the third lens L3 is denoted by f3, a curvature radius of an object side surface of the fourth lens L4 is denoted by R7, a curvature radius of an image side surface of the fourth lens L4 is denoted by R8, an on-axis thickness of the first lens L1 is denoted by d1, an on-axis denoted by distance from an image side surface of the first lens L1 to an object side surface of the second lens L2 is denoted by d2, and the camera optical lens satisfies the following conditions:

$$0.90 \leq f1/f \leq 1.30 \tag{1}$$

$$-5.00 \leq f3/f \leq -2.50 \tag{2}$$

$$10.00 \leq d1/d2 \leq 25.00 \tag{3}$$

$$0 \leq (R7+R8)/(R7-R8) \leq 0.90 \tag{4}$$

Herein, the condition (1) specifies a ratio of the focal length f1 of the first lens L1 to the focal length f of the camera optical lens 10. Within a range defined by the condition (1), it can effectively balance spherical aberration and field curvature of the system.

The condition (2) specifies a ratio of the focal length f3 of the third lens L3 to the focal length f of the camera optical lens 10. Reasonable allocation of refractive power enables the system to have better imaging quality and lower sensitivity.

The condition (3) specifies a ratio of a thickness of the first lens to an air gap between the first and second lenses. Within a range defined by this condition, it is beneficial to reduce the total optical length and achieve ultra-thinness.

The condition (4) specifies a shape of the fourth lens L4. Within a range defined by this condition, it is beneficial to alleviate a degree of deflection of light passing through the lens and effectively reduce aberration.

It is defined that a curvature radius of an object side surface of the fifth lens L5 is denoted by R9, a curvature radius of an image side surface of the fifth lens L5 is denoted by R10, and the camera optical lens satisfies the following condition: $2.00 \leq R9/R10 \leq 12.00$, which specifies a shape of the fifth lens L5. Within a range defined by this condition, with the development of ultra-thinness and wide angle, it is beneficial to correct off-axis aberration.

In this embodiment, the object side surface of the first lens L1 is a convex surface at a paraxial position, and the image side surface of the first lens L1 is a convex surface at a paraxial position.

It is defined that a curvature radius of the object side surface of the first lens L1 is denoted by R1, a curvature radius of the image side surface of the first lens L1 is denoted by R2, and the camera optical lens further satisfies the following condition: $-2.49 \leq (R1+R2)/(R1-R2) \leq -0.40$. By reasonably controlling a shape of the first lens L1, the first lens L1 can effectively correct spherical aberration of the system. As an example, the camera optical lens further satisfies the following condition: $-1.55 \leq (R1+R2)/(R1-R2) \leq -0.50$.

It is defined that an on-axis thickness of the first lens L1 is denoted by d1, a total optical length from the object side surface of the first lens to the image plane of the camera optical lens 10 along an optic axis is denoted by TTL, and the camera optical lens further satisfies the following condition: $0.14 \leq d1/TTL \leq 0.50$. Within a range defined by this condition, it is beneficial to achieve ultra-thinness. As an example, the camera optical lens further satisfies the following condition: $0.22 \leq d1/TTL \leq 0.40$.

In this embodiment, the object side surface of the second lens L2 is a concave surface at a paraxial position, and the image side surface of the second lens L2 is a concave surface at a paraxial position.

It is defined that a focal length of the camera optical lens 10 is denoted by f, a focal length of the second lens L2 is denoted by f2, and the camera optical lens further satisfies the following condition: $-183.18 \leq f2/f \leq -1.88$. By controlling the refractive power of the second lens L2 within a reasonable range, it is beneficial to correct aberration of the optical system. As an example, the camera optical lens further satisfies the following condition: $-114.49 \leq f2/f \leq -2.35$.

It is defined that a curvature radius of the object side surface of the second lens L2 is denoted by R3, a curvature radius of the image side surface of the second lens L2 is denoted by R4, and the camera optical lens further satisfies the following condition: $-0.18 \leq (R3+R4)/(R3-R4) \leq 58.22$, which specifies a shape of the second lens L2. Within a range defined by this condition, with the development of ultra-thinness and wide angle of the camera optical lens, it is beneficial to correct longitudinal aberration. As an example, the camera optical lens further satisfies the following condition: $-0.11 \leq (R3+R4)/(R3-R4) \leq 46.58$.

The total optical length from the object side surface of the first lens to the image plane of the camera optical lens 10 along the optic axis is denoted by TTL, it is defined that an on-axis thickness of the second lens L2 is denoted by d3, and the camera optical lens further satisfies the following condition: $0.02 \leq d3/TTL \leq 0.08$. Within a range defined by this condition, it is beneficial to achieve ultra-thinness. As an example, the camera optical lens further satisfies the following condition: $0.045 \leq d3/TTL \leq 0.06$.

In this embodiment, the object side surface of the third lens L3 is a concave surface at a paraxial position, and the image side surface of the third lens L3 is a concave surface at a paraxial position.

It is defined that a curvature radius of the object side surface of the third lens L3 is denoted by R5, a curvature radius of the image side surface of the third lens L3 is denoted by R6, and the camera optical lens further satisfies the following condition: $-11.33 \leq (R5+R6)/(R5-R6) \leq 2.23$. This condition specifies a shape of the third lens L3, which is beneficial to forming of the third lens L3, and can avoid forming defects and stress caused by excessively large surface curvature of the third lens L3. As an example, the camera optical lens further satisfies the following condition: $-7.08 \leq (R5+R6)/(R5-R6) \leq 1.78$.

The total optical length from the object side surface of the first lens to the image plane of the camera optical lens 10 along the optic axis is denoted by TTL, it is defined that an on-axis thickness of the third lens L3 is denoted by d5, and the camera optical lens further satisfies the following condition: $0.02 \leq d5/TTL \leq 0.09$. Within a range defined by this condition, it is beneficial to achieve ultra-thinness. As an example, the camera optical lens further satisfies the following condition: $0.04 \leq d5/TTL \leq 0.07$.

In this embodiment, the object side surface of the fourth lens L4 is a convex surface at a paraxial position, and the image side surface of the fourth lens L4 is a convex surface at a paraxial position.

It is defined that a focal length of the camera optical lens 10 is denoted by f, a focal length of the fourth lens L4 is denoted by f4, and the camera optical lens further satisfies the following condition: $0.33 \leq f4/f \leq 1.23$. Reasonable allocation of focal power enables the system to have better imaging quality and lower sensitivity. As an example, the camera optical lens further satisfies the following condition: $0.53 \leq f4/f \leq 0.99$.

The total optical length from the object side surface of the first lens to the image plane of the camera optical lens 10 along the optic axis is denoted by TTL, it is defined that an on-axis thickness of the fourth lens L4 is denoted by d7, and the camera optical lens further satisfies the following condition: $0.05 \leq d7/TTL \leq 0.22$. Within a range defined by this condition, it is beneficial to achieving ultra-thinness. As an example, the camera optical lens further satisfies the following condition: $0.07 \leq d7/TTL \leq 0.17$.

In this embodiment, the object side surface of the fifth lens L5 is a convex surface at a paraxial position, and the image side surface of the fifth lens L5 is a concave surface at a paraxial position.

The focal length of the camera optical lens 10 is denoted by f, it is defined that a focal length of the fifth lens L5 is denoted by f5, and the camera optical lens further satisfies the following condition: $-1.59 \leq f5/f \leq -0.37$. Reasonable allocation of focal power can effectively smooth a light angle of the camera optical lens and reduce tolerance sensitivity. As an example, the camera optical lens further satisfies the following condition: $-0.99 \leq f5/f \leq -0.46$.

A curvature radius of the object side surface of the fifth lens L5 is denoted by R9, a curvature radius of the image side surface of the fifth lens L5 is denoted by R10, and the camera optical lens further satisfies the following condition: $0.59 \leq (R9+R10)/(R9-R10) \leq 4.49$, which specifies a shape of the fifth lens L5. Within a range defined by this condition, with the development of ultra-thinness and wide angle, it is beneficial to correct off-axis aberration. As an example, the camera optical lens further satisfies the following condition: $0.95 \leq (R9+R10)/(R9-R10) \leq 3.60$.

The total optical length from the object side surface of the first lens to the image plane of the camera optical lens 10 along the optic axis is denoted by TTL, it is defined that an on-axis thickness of the fifth lens L5 is denoted by d9, and the camera optical lens further satisfies the following condition: $0.04 \leq d9/TTL \leq 0.14$. Within a range defined by this condition, it is beneficial to achieve ultra-thinness. As an example, the camera optical lens further satisfies the following condition: $0.06 \leq d9/TTL \leq 0.11$ is satisfied.

In this embodiment, an image height of the camera optical lens 10 is denoted by IH, and the camera optical lens further satisfies the following condition: $TTL/IH \leq 1.51$, thereby being beneficial to achieving ultra-thinness.

In this embodiment, a field of view (FOV) of the camera optical lens 10 is larger than or equal to 81.00°, thereby achieving a wide angle.

In this embodiment, the focal length of the camera optical lens 10 is denoted by f, a combined focal length of the first lens L1 and the second lens L2 is denoted by f12, and the camera optical lens further satisfies the following condition: $0.59 \leq f12/f \leq 2.04$. Within a range defined by this condition, aberration and distortion of the camera optical lens 10 can be eliminated, and a back focal length of the camera optical lens 10 can be reduced to maintain miniaturization of the image lens system group. As an example, the camera optical lens further satisfies the following condition: $0.94 \leq f12/f \leq 1.64$.

In addition, in the camera optical lens 10 provided by this embodiment, the surfaces of the lenses can be designed as aspherical surfaces, and the aspherical surface can be easily made into a shape other than a spherical surface to obtain more control variables, thereby eliminating and reducing aberration and reducing the number of lenses used. Therefore, the total length of the camera optical lens 10 can be effectively reduced. In this embodiment, the object side surface and the image side surface of each lens are aspherical surfaces.

It should be noted that, since the first lens L1, the second lens L2, the third lens L3, the fourth lens L4, and the fifth lens L5 have the aforementioned structures and parameter conditions, the camera optical lens 10 can reasonably allocate the optical power, distances and shapes of the respective lenses, thereby correcting various aberrations.

In this way, the camera optical lens 10 not only has good optical imaging performance, but also meets the design requirements of a large aperture, a wide angle, and ultra-thinness.

The camera optical lens 10 of the present invention will be described in the following by examples. The symbols described in each example are as follows. The focal length, the on-axis distance, the curvature radius, the on-axis thickness, the inflection point position, and stagnation point position are all expressed in unit of mm.

TTL: a total optical length (an on-axis distance from an object side surface of a first lens L1 to an image surface Si along an optic axis), in unit of mm.

In addition, at least one of the object side surface and the image side surface of each lens may also be provided with an inflection point and/or a stagnation point to meet high-quality imaging requirements. For specific implementation manners, please refer to the following description.

FIG. 1 shows design data of the camera optical lens 10.

For the first lens L1 to the fifth lens L5 constituting the camera optical lens 10 according to Embodiment 1 of the present invention, the curvature radius R of the object side surface and the curvature radius R of the image side surface of each lens, the on-axis thickness of each lens, the distance d between two adjacent lenses, the refractive index nd and the abbe number vd are listed in Table 1. It should be noted that in this embodiment, R and d are expressed in unit of millimeters (mm).

TABLE 1

| | R | d | nd | vd |
|---|---|---|---|---|
| S1 | ∞ | d0= −0.058 | | |
| R1 | 1.905 | d1= 1.220 | nd1 1.5444 | v1 55.82 |
| R2 | −25.683 | d2= 0.057 | | |
| R3 | −19.296 | d3= 0.220 | nd2 1.6700 | v2 19.39 |

TABLE 1-continued

| | R | d | nd | vd |
|---|---|---|---|---|
| R4 | 9.353 | d4= 0.221 | | |
| R5 | −12.110 | d5= 0.268 | nd3 1.6400 | v3 23.54 |
| R6 | 16.771 | d6= 0.209 | | |
| R7 | 2.276 | d7= 0.560 | nd4 1.5444 | v4 55.82 |
| R8 | −2.251 | d8= 0.169 | | |
| R9 | 2.972 | d9= 0.390 | nd5 1.5346 | v5 55.69 |
| R10 | 0.788 | d10= 0.283 | | |
| R11 | ∞ | d11= 0.210 | ndg 1.5168 | vg 64.17 |
| R12 | ∞ | d12= 0.563 | | |

The symbol in the above table are defined as follows.
S1: aperture;
R: curvature radius at a center of an optical surface;
R1: curvature radius of an object side surface of a first lens L1;
R2: curvature radius of an image side surface of the first lens L1;
R3: curvature radius of an object side surface of a second lens L2;
R4: curvature radius of an image side surface of the second lens L2;
R5: curvature radius of an object side surface of a third lens L3;
R6: curvature radius of an image side surface of the third lens L3;
R7: curvature radius of an object side surface of a fourth lens L4;
R8: curvature radius of an image side surface of the fourth lens L4;
R9: curvature radius of an object side surface of a fifth lens L5;
R10: curvature radius of an image side surface of the fifth lens L5;
R11: curvature radius of an object side surface of an optical filter GF;
R12: curvature radius of an image side surface of the optical filter GF;
d: on-axis thickness of a lens, on-axis distance between lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the optical filter GF;
d11: on-axis thickness of optical filter GF;
d12: on-axis distance from the image side surface of the optical filter GF to the image plane;
nd: refractive index of d-line;
nd1: refractive index of the d-line of the first lens L1;
nd2: refractive index of d-line of the second lens L2;
nd3: refractive index of d-line of the third lens L3;
nd4: refractive index of d-line of the fourth lens L4;

nd5: refractive index of d-line of the fifth lens L5;
ndg: refractive index of d-line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
vg: abbe number of the optical filter GF.

Table 2 shows the aspherical surface data of the lenses in the camera optical lens 10 according to Embodiment 1 of the present invention.

of the third lens L3; P4R1 and P4R2 respectively represent the object side surface and image side surface of the fourth lens L4; and P5R1 and P5R2 respectively represent the object side surface and image side surface of the fifth lens L5. The corresponding data in the "inflection point position" column is a vertical distance from the inflection point set on a surface of each lens to the optic axis of the camera optical lens 10. The corresponding data in the "stagnation point position" column is a vertical distance from the stagnation point set on a surface of each lens to the optic axis of the camera optical lens 10.

TABLE 2

| | Cone coefficient | Aspherical coefficient | | | | |
|---|---|---|---|---|---|---|
| | k | A4 | A6 | A8 | A10 | A12 |
| R1 | −1.4561E+01 | 2.6442E−01 | −4.9623E−01 | −7.5726E−02 | 1.0212E+01 | −5.6993E+01 |
| R2 | 4.4933E+02 | −4.7881E−01 | 2.6995E+00 | −1.8390E+01 | 7.8246E+01 | −2.0262E+02 |
| R3 | 4.0903E+02 | −5.5961E−01 | 3.6521E+00 | −2.4550E+01 | 9.9512E+01 | −2.3434E+02 |
| R4 | 3.0058E+01 | −1.4660E−01 | 2.4240E+00 | −1.6453E+01 | 6.0646E+01 | −1.3388E+02 |
| R5 | 1.1076E+02 | −1.5187E−01 | 2.9487E+00 | −1.4609E+01 | 4.0283E+01 | −7.1058E+01 |
| R6 | 1.6809E+02 | −5.2002E−01 | 2.6344E+00 | −8.3570E+00 | 1.5743E+01 | −1.8688E+01 |
| R7 | −2.6703E+01 | −8.3803E−02 | 3.8651E−01 | −7.5425E−01 | 9.0687E−01 | −8.4386E−01 |
| R8 | −1.4190E+01 | 2.0836E−02 | 3.9405E−02 | 2.4588E−01 | −3.6587E−01 | 2.0818E−01 |
| R9 | −9.2887E+01 | −5.6883E−01 | 5.1139E−01 | −2.6874E−01 | 1.1576E−01 | −4.4088E−02 |
| R10 | −4.8736E+00 | −2.5664E−01 | 2.6211E−01 | −2.0468E−01 | 1.1613E−01 | −4.5901E−02 |

| | Cone coefficient | Aspherical coefficient | | | |
|---|---|---|---|---|---|
| | k | A14 | A16 | A18 | A20 |
| R1 | −1.4561E+01 | 1.5974E+02 | −2.4896E+02 | 2.0053E+02 | −6.1630E+01 |
| R2 | 4.4933E+01 | 3.2671E+02 | −3.2363E+02 | 1.8091E+02 | −4.3615E+01 |
| R3 | 4.0903E+02 | 3.2579E+02 | −2.5654E+02 | 9.8394E+01 | −1.0925E+01 |
| R4 | 3.0058E+01 | 1.8272E+02 | −1.5108E+02 | 6.9209E+01 | −1.3435E+01 |
| R5 | 1.1076E+02 | 8.2648E+01 | −6.1915E+01 | 2.2753E+01 | −5.8381E+00 |
| R6 | 1.6809E+02 | 1.4038E+01 | −6.3790E+00 | 1.5569E+00 | −1.4741E−01 |
| R7 | −2.6703E+01 | 6.0621E+01 | −3.1349E−01 | 9.5921E−02 | −1.2238E−02 |
| R8 | −1.4190E−01 | −5.8568E−02 | 7.7998E−03 | −2.6138E−04 | −2.6062E−05 |
| R9 | −9.2887E+01 | 1.2977E−02 | −2.5230E−03 | 2.7984E−04 | −1.3329E−05 |
| R10 | −4.8736E+00 | 1.1957E−02 | −1.9280E−03 | 1.7306E−04 | −6.5826E−06 |

In Table 2, k represents a cone coefficient, and A4, A6, A8, A10, A12, A14, A16, A18, and A20 represent aspherical coefficients.

IH: image height $$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16}+A18x^{18}+A20x^{20} \quad (5)$$

In the equation (5), x represents a vertical distance between a point on an aspherical curve and an optic axis, and y represents an aspherical depth (a vertical distance between a point on the aspherical surface that is distanced from the optic axis by R and a surface tangent to a vertex of the aspherical surface on the optic axis).

For convenience, the aspherical surface of each lens adopts the aspherical surface shown in the above equation (5). However, the present invention is not limited to the aspherical surface polynomial form expressed by the equation (5).

Table 3 and Table 4 show the design data of the inflection point and the stagnation point of each lens in the camera optical lens 10 according to this embodiment. Herein, P1R1 and P1R2 respectively represent the object side surface and image side surface of the first lens L1; P2R1 and P2R2 respectively represent the object side surface and image side surface of the second lens L2; P3R1 and P3R2 respectively represent the object side surface and the image side surface

TABLE 3

| | Number of inflection points | Inflection point position 1 | Inflection point position 2 | Inflection point position 3 |
|---|---|---|---|---|
| P1R1 | 0 | / | / | / |
| P1R2 | 1 | 0.775 | / | / |
| P2R1 | 1 | 0.675 | / | / |
| P2R2 | 2 | 0.855 | 0.935 | / |
| P3R1 | 2 | 0.265 | 0.555 | / |
| P3R2 | 2 | 0.115 | 1.065 | / |
| P4R1 | 2 | 0.735 | 1.345 | / |
| P4R2 | 2 | 0.605 | 1.065 | / |
| P5R1 | 3 | 0.185 | 1.025 | 2.025 |
| P5R2 | 3 | 0.455 | 2.195 | 2.365 |

TABLE 4

| | Number of stagnation points | Stagnation point position 1 | Stagnation point position 2 | Stagnation point position 3 |
|---|---|---|---|---|
| P1R1 | 0 | / | / | / |
| P1R2 | 0 | / | / | / |
| P2R1 | 1 | 0.865 | / | / |
| P2R2 | 0 | / | / | / |
| P3R1 | 2 | 0.465 | 0.625 | / |

TABLE 4-continued

|  | Number of stagnation points | Stagnation point position 1 | Stagnation point position 2 | Stagnation point position 3 |
|---|---|---|---|---|
| P3R2 | 2 | 0.195 | 1.175 | / |
| P4R1 | 1 | 1.015 | / | / |
| P4R2 | 0 | / | / | / |
| P5R1 | 3 | 0.345 | 1.815 | 2.095 |
| P5R2 | 1 | 1.265 | / | / |

In addition, the values corresponding to the various parameters and the parameters specified in the respective conditions in each of Embodiments 1, 2, 3, 4 and 5 are listed in Table 21.

As shown in Table 21, Embodiment 1 satisfies the respective conditions.

Figure 2:
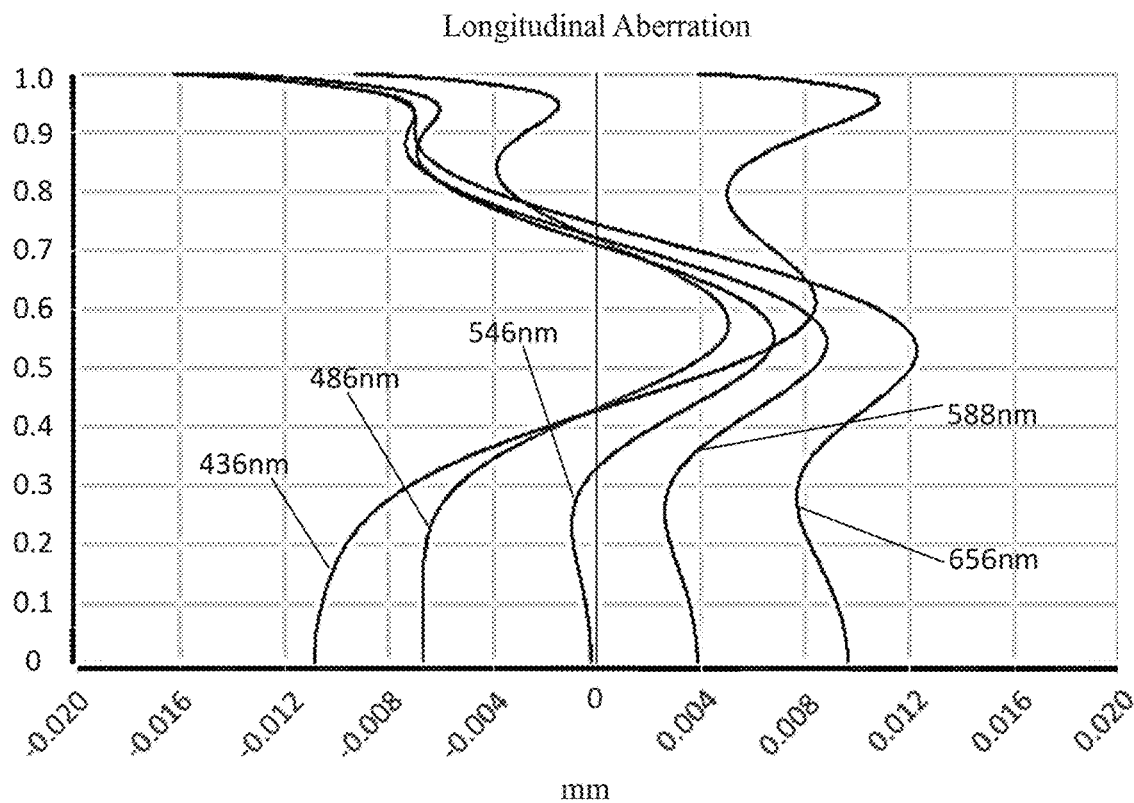
FIG. 2 is a schematic diagram of longitudinal aberration of the camera optical lens shown in FIG. 1.
Figure 3:
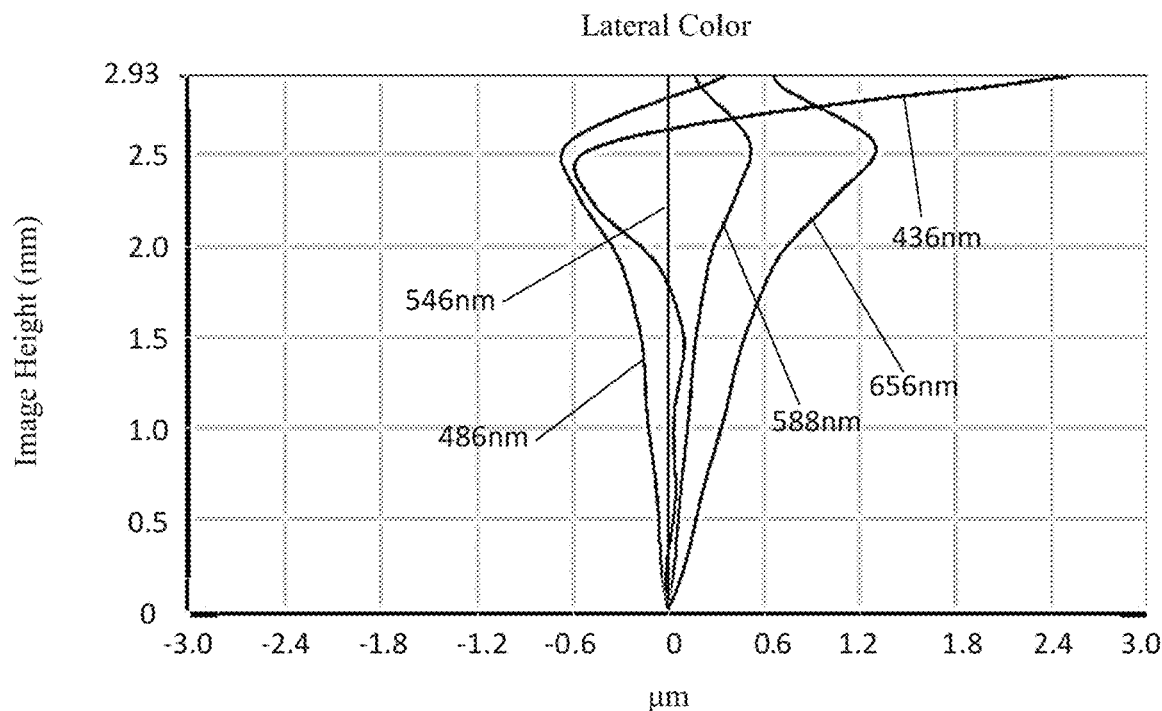
FIG. 3 is a schematic diagram of lateral color of the camera optical lens shown in FIG. 1.
Figure 4:
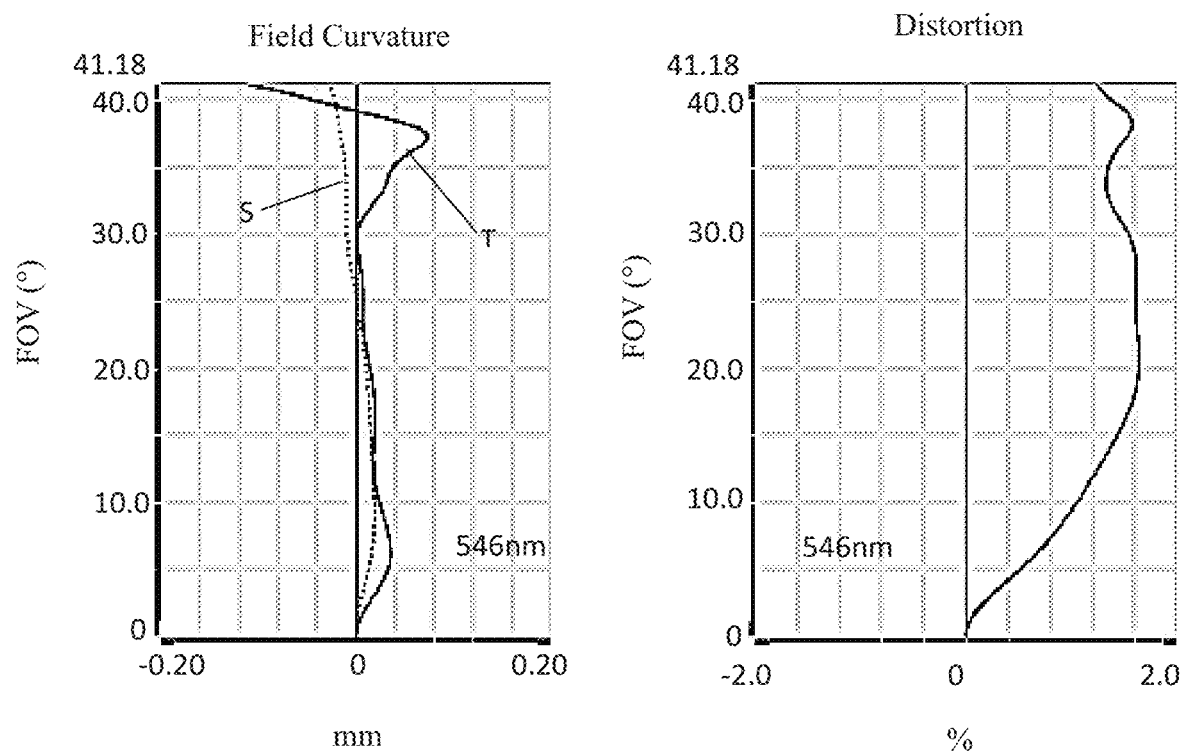
FIG. 4 is a schematic diagram of field curvature and distortion of the camera optical lens shown in FIG. 1.

FIG. 2 and FIG. 3 respectively show schematic diagrams of longitudinal aberration and lateral color of light having wavelengths of 656 nm, 588 nm, 546 nm, 486 nm, and 436 nm after passing through the camera optical lens 10. FIG. 4 shows a schematic diagram of field curvature and distortion of light having a wavelength of 546 nm after passing through the camera optical lens 10. In FIG. 4, the field curvature S is the field curvature in a sagittal direction, and the field curvature T is the field curvature in a meridian direction.

In this embodiment, an entrance pupil diameter ENPD of the camera optical lens 10 is 1.317 mm, the full field of view image height IH is 2.930 mm, and the FOV in a diagonal direction is 82.38°, so that the camera optical lens 10 can meet the design requirements of a large aperture, a wide angle and ultra-thinness. The on-axis and off-axis color aberrations are fully corrected, and the camera optical lens 10 has excellent optical performance.

Embodiment 2

Figure 5:
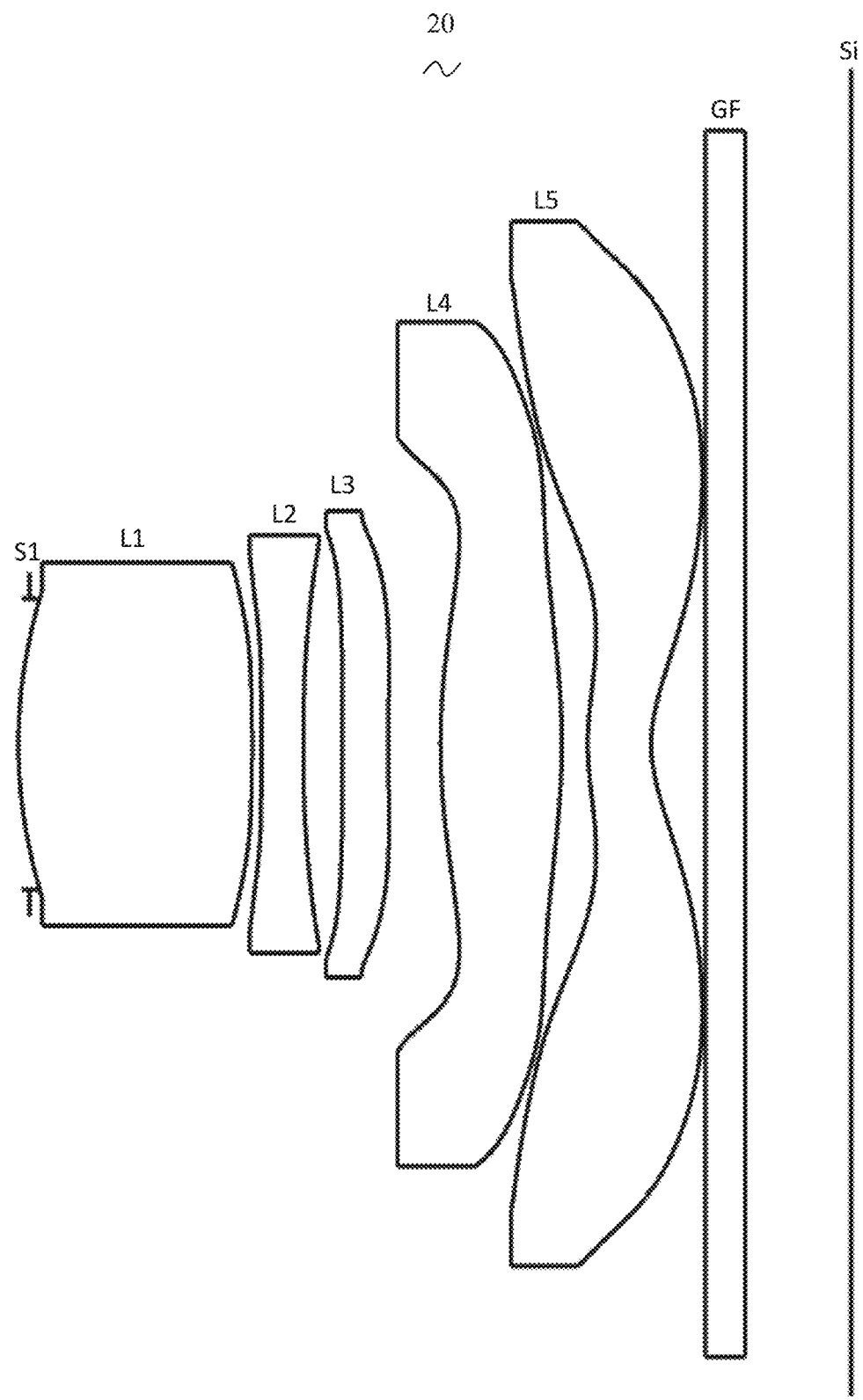
FIG. 5 is a schematic structural diagram of a camera optical lens according to Embodiment 2.

FIG. 5 is a schematic structural diagram of a camera optical lens 20 according to Embodiment 2. Embodiment 2 is basically the same as Embodiment 1, the symbols have the same representation as Embodiment 1, and only the difference from Embodiment 1 will be described in the following.

Table 5 and Table 6 show the design data of the camera optical lens 20 according to Embodiment 2 of the present invention.

TABLE 5

|  | R | d |  | nd |  | vd |
|---|---|---|---|---|---|---|
| S1 | ∞ | d0= | −0.058 |  |  |  |
| R1 | 1.947 | d1= | 1.227 | nd1 | 1.5444 | v1 | 55.82 |
| R2 | −7.696 | d2= | 0.050 |  |  |  |
| R3 | −11.629 | d3= | 0.220 | nd2 | 1.6700 | v2 | 19.39 |
| R4 | 13.942 | d4= | 0.205 |  |  |  |
| R5 | −128.493 | d5= | 0.240 | nd3 | 1.6400 | v3 | 23.54 |
| R6 | 5.576 | d6= | 0.275 |  |  |  |
| R7 | 2.855 | d7= | 0.636 | nd4 | 1.5444 | v4 | 55.82 |
| R8 | −2.852 | d8= | 0.136 |  |  |  |
| R9 | 1.117 | d9= | 0.333 | nd5 | 1.5346 | v5 | 55.69 |
| R10 | 0.558 | d10= | 0.283 |  |  |  |
| R11 | ∞ | d11= | 0.210 | ndg | 1.5168 | vg | 64.17 |
| R12 | ∞ | d12= | 0.555 |  |  |  |

Table 6 shows the aspherical surface data of the lenses in the camera optical lens 20 according to Embodiment 2 of the present invention.

| | Cone coefficient | Aspherical coefficient | | | | |
|---|---|---|---|---|---|---|
| | k | A4 | A6 | A8 | A10 | A12 |
| R1 | 1.5465E+01 | 2.0750E−01 | 3.0076E−01 | −8.0666E+00 | 6.2860E+01 | −2.8847E+02 |
| R2 | 7.7588E+01 | 2.8187E−01 | −4.2428E+00 | 1.8379E+01 | −4.8956E+01 | 9.3188E+01 |
| R3 | 1.7066E+02 | 5.5486E−01 | −5.0140E+00 | 1.6740E+01 | −3.0114E+01 | 2.8534E+01 |
| R4 | 9.9000E+01 | 4.7700E−01 | −1.8596E+00 | 2.0866E+00 | 4.5650E+00 | −2.7343E+01 |
| R5 | 2.5000E+02 | −1.0645E−01 | 3.1797E−01 | −1.1896E+00 | 3.2782E+00 | −7.0038E+00 |
| R6 | −1.9469E+01 | −4.3126E−01 | 8.0034E−01 | −2.2302E+00 | 5.7693E+00 | −1.0921E+01 |
| R7 | −1.1261E+01 | 1.3236E−01 | −6.8740E−01 | 1.5876E+00 | −2.3267E+00 | 2.0228E+00 |
| R8 | 3.2462E−01 | 1.2892E−01 | −5.7513E−02 | 1.0135E−02 | 7.5545E−02 | −1.1481E−01 |
| R9 | −1.2059E+01 | −7.4147E−01 | 7.7493E−01 | −5.3172E−01 | 2.8768E−01 | −1.1716E−01 |
| R10 | −4.2331E+00 | −3.6897E−01 | 4.1509E−01 | −3.2716E−01 | 1.8178E−01 | −7.0325E−02 |

| | Cone coefficient | Aspherical coefficient | | | |
|---|---|---|---|---|---|
| | k | A14 | A16 | A18 | A20 |
| R1 | −1.5465E−01 | 8.2473E+02 | −1.4396E+03 | 1.4041E+03 | −5.8676E+02 |
| R2 | 7.7588E+01 | −1.2602E+02 | 1.1485E+02 | −6.4631E+01 | 1.7585E+01 |
| R3 | 1.7066E+02 | −9.7304E−01 | −3.0909E+01 | 3.1643E+01 | −1.0432E+01 |
| R4 | 9.9000E+01 | 5.3926E+01 | −5.6915E+01 | 3.1914E+01 | −7.5190E+00 |
| R5 | 2.5000E+02 | 1.1256E+01 | −1.2836E+01 | 8.6654E+00 | −2.4672E+00 |
| R6 | −1.9469E+01 | 1.3765E+01 | −1.0883E+01 | 4.7859E+00 | −8.5883E−01 |
| R7 | −1.1261E+01 | −9.3553E−01 | 1.2039E−01 | 5.8276E−02 | −1.6427E−02 |
| R8 | 3.2462E−01 | 7.0512E−02 | −2.1883E−02 | 3.4200E−03 | −2.1509E−04 |
| R9 | −1.2059E+01 | 3.2756E−02 | −5.7966E−03 | 5.8115E−04 | −2.5129E−05 |
| R10 | −4.2331E+00 | 1.8142E−02 | −2.9275E−03 | 2.69452E−04 | −1.0149E−05 |

Table 7 and Table 8 show the design data of the inflection point and stagnation point of each lens in the camera optical lens 20.

TABLE 7

|  | Number of inflection points | Inflection point position 1 | Inflection point position 2 | Inflection point position 3 |
|---|---|---|---|---|
| P1R1 | 0 | / | / | / |
| P1R2 | 0 | / | / | / |

TABLE 7-continued

|  | Number of inflection points | Inflection point position 1 | Inflection point position 2 | Inflection point position 3 |
|---|---|---|---|---|
| P2R1 | 2 | 0.645 | 0.775 | / |
| P2R2 | 1 | 0.855 | / | / |
| P3R1 | 0 | / | / | / |
| P3R2 | 2 | 0.205 | 0.975 | / |
| P4R1 | 2 | 0.605 | 1.295 | / |
| P4R2 | 2 | 0.585 | 1.055 | / |
| P5R1 | 3 | 0.255 | 1.065 | 2.025 |
| P5R2 | 3 | 0.395 | 2.235 | 2.345 |

TABLE 8

|  | Number of stagnation points | Stagnation point position 1 | Stagnation point position 2 |
|---|---|---|---|
| P1R1 | 0 | / | / |
| P1R2 | 0 | / | / |
| P2R1 | 0 | / | / |
| P2R2 | 0 | / | / |
| P3R1 | 0 | / | / |
| P3R2 | 2 | 0.365 | 1.055 |
| P4R1 | 1 | 0.945 | / |
| P4R2 | 0 | / | / |
| P5R1 | 1 | 0.495 | / |
| P5R2 | 1 | 1.225 | / |

In addition, the values corresponding to the various parameters and the parameters specified in the conditions in Embodiment 2 are listed in Table 21. It can be seen that the camera optical lens according to this embodiment satisfies the above-mentioned conditions.

Figure 6:
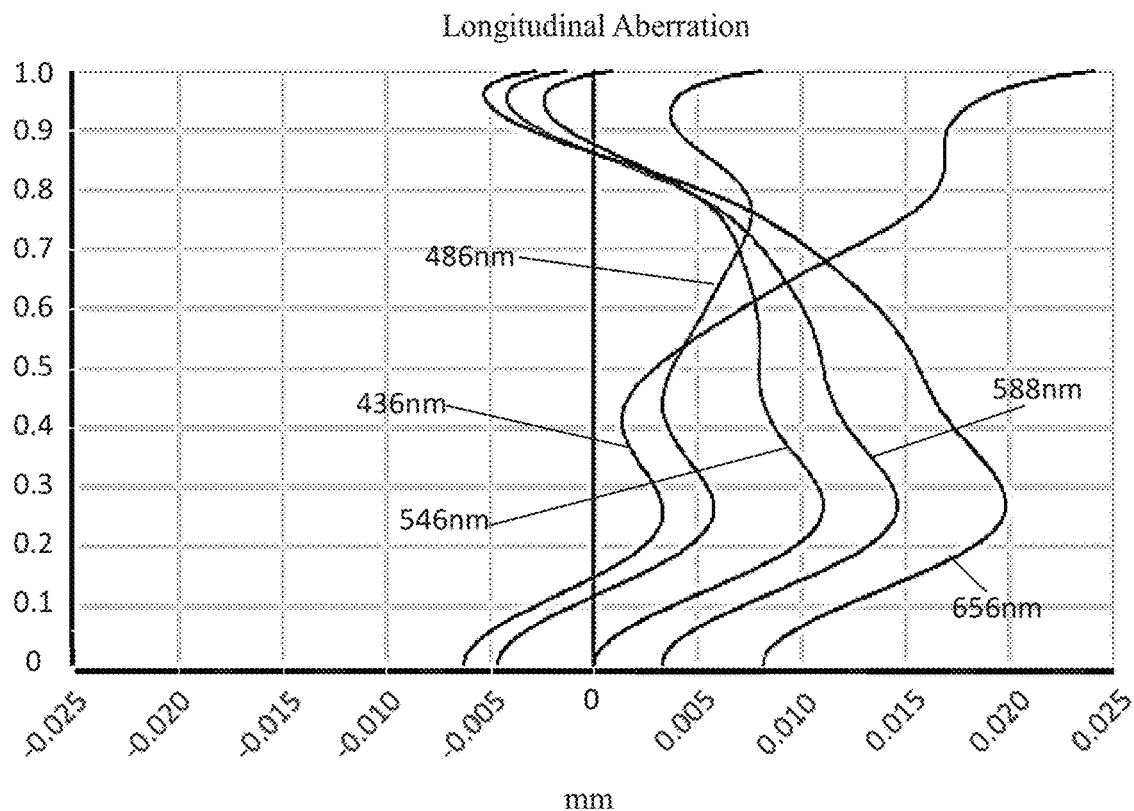
FIG. 6 is a schematic diagram of longitudinal aberration of the camera optical lens shown in FIG. 5.
Figure 7:
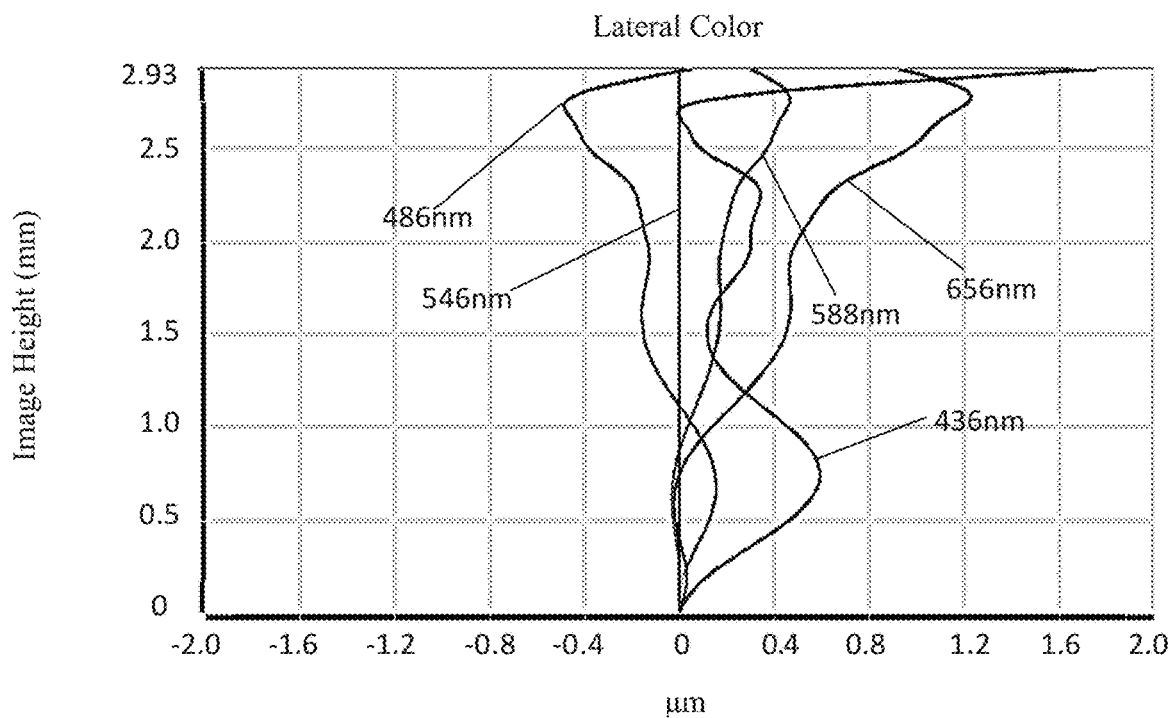
FIG. 7 is a schematic diagram of lateral color of the camera optical lens shown in FIG. 5.
Figure 8:
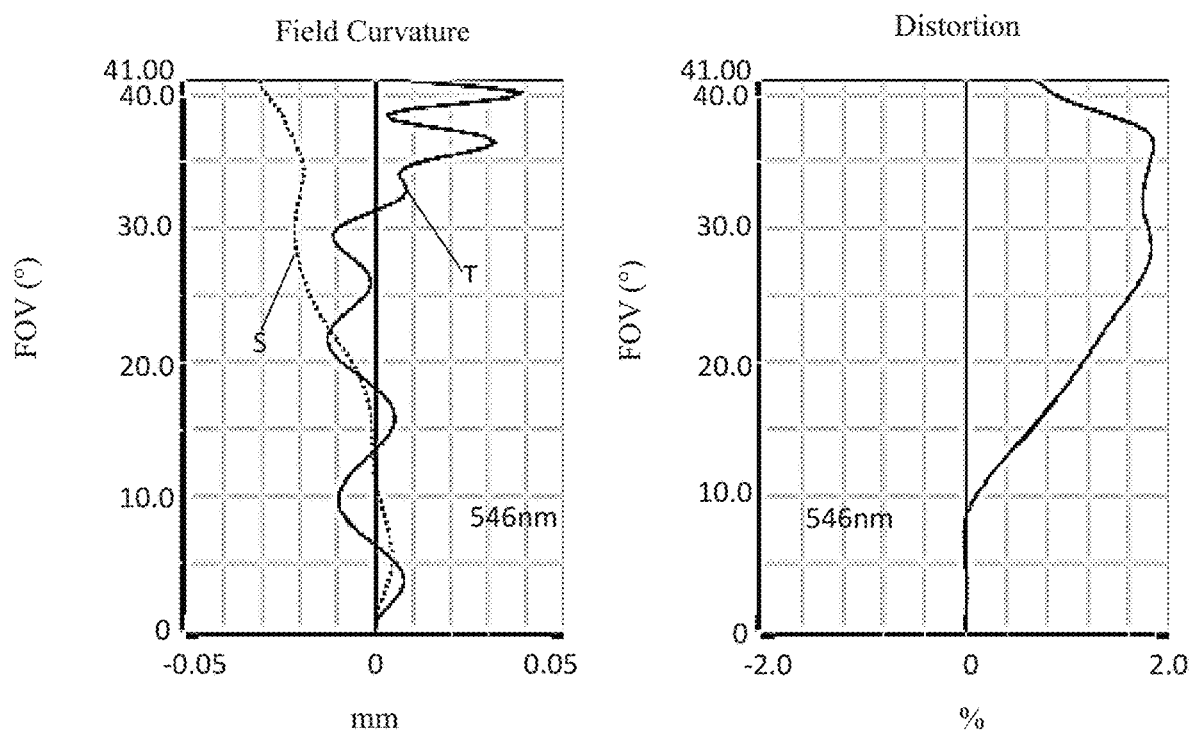
FIG. 8 is a schematic diagram of field curvature and distortion of the camera optical lens shown in FIG. 5.

FIG. 6 and FIG. 7 respectively show schematic diagrams of longitudinal aberration and lateral color of light having wavelengths of 656 nm, 588 nm, 546 nm, 486 nm and 436 nm after passing through the camera optical lens 20. FIG. 8 shows a schematic diagram of field curvature and distortion of light having a wavelength of 546 nm after passing through the camera optical lens 20. In FIG. 8, the field curvature S is the field curvature in a sagittal direction, and the field curvature T is the field curvature in a meridian direction.

In this embodiment, an entrance pupil diameter ENPD of the camera optical lens 20 is 1.332 mm, the full field of view image height IH is 2.930 mm, and the FOV in a diagonal direction is 82.00°, so that the camera optical lens 20 can meet the design requirements of a large aperture, a wide angle and ultra-thinness. The on-axis and off-axis color aberrations are fully corrected, and the camera optical lens 20 has excellent optical performance.

Embodiment 3

Figure 9:
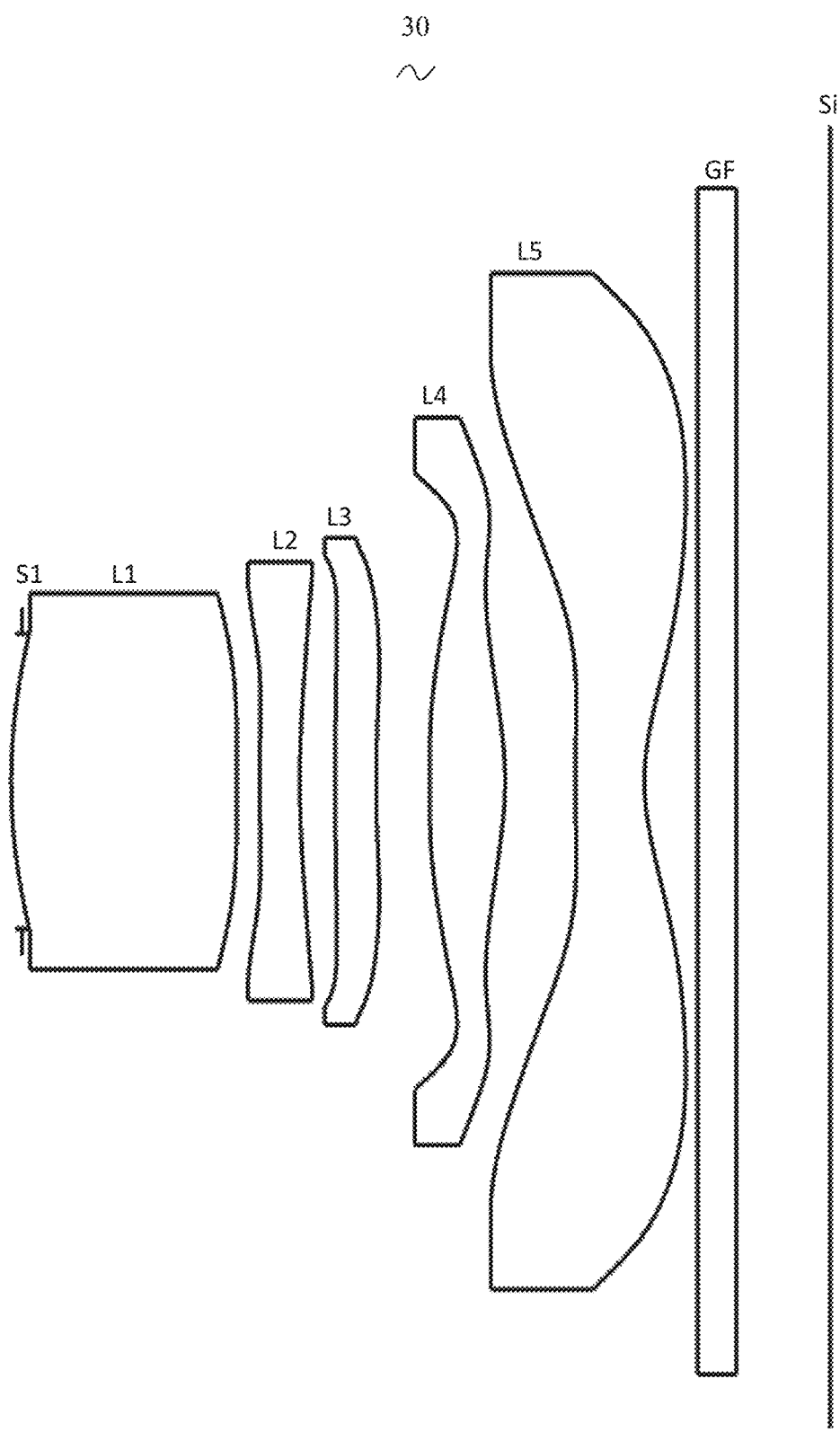
FIG. 9 is a schematic structural diagram of a camera optical lens according to Embodiment 3.

FIG. 9 is a schematic structural diagram of a camera optical lens 30 according to Embodiment 3. Embodiment 3 is basically the same as Embodiment 1. The representation of the symbols in the following tables is defined the same as that of Embodiment 1, the same part will not be repeated herein, and only the difference from Embodiment 1 is described in the following.

In this embodiment, the object side surface of the second lens L2 is a convex surface at a paraxial position.

In this embodiment, the object side surface of the third lens L3 is a convex surface at a paraxial position.

Table 9 and Table 10 show the design data of the camera optical lens 30 according to Embodiment 3 of the present invention.

TABLE 9

|  | R |  | d | nd |  | vd |  |
|---|---|---|---|---|---|---|---|
| S1 | ∞ | d0= | −0.058 |  |  |  |  |
| R1 | 2.202 | d1= | 1.207 | nd1 | 1.5444 | v1 | 55.82 |
| R2 | −84.082 | d2= | 0.120 |  |  |  |  |
| R3 | 5.315 | d3= | 0.215 | nd2 | 1.6701 | v2 | 19.39 |
| R4 | 4.069 | d4= | 0.189 |  |  |  |  |
| R5 | 43.780 | d5= | 0.220 | nd3 | 1.6400 | v3 | 23.54 |
| R6 | 8.529 | d6= | 0.285 |  |  |  |  |
| R7 | 24.736 | d7= | 0.403 | nd4 | 1.5444 | v4 | 55.82 |
| R8 | −1.307 | d8= | 0.375 |  |  |  |  |
| R9 | 5.160 | d9= | 0.369 | nd5 | 1.5346 | v5 | 55.69 |
| R10 | 0.860 | d10= | 0.283 |  |  |  |  |
| R11 | ∞ | d11= | 0.210 | ndg | 1.5168 | vg | 64.17 |
| R12 | ∞ | d12= | 0.499 |  |  |  |  |

Table 10 shows the aspherical surface data of the lenses in the camera optical lens 30 according to Embodiment 3 of the present invention.

TABLE 10

|  | Cone coefficient | Aspherical coefficient | | | | |
|---|---|---|---|---|---|---|
|  | k | A4 | A6 | A8 | A10 | A12 |
| R1 | −1.9185E+01 | 1.7780E−01 | 6.2570E−02 | −4.1910E+00 | 3.1479E+01 | −1.3729E+02 |
| R2 | −9.9000E+01 | −5.0882E−01 | 2.2780E+00 | −1.8297E+01 | 7.4486E+01 | −1.8492E+02 |
| R3 | −5.8001E−01 | −6.3028E−01 | 3.9590E+00 | −2.5260E+01 | 9.0125E+01 | −1.9216E+02 |
| R4 | −3.6144E+01 | −1.5837E−01 | 2.0777E+00 | −1.1842E+01 | 3.5288E+01 | −6.2738E+01 |
| R5 | −9.9000E+01 | 4.0085E−01 | −4.1589E+00 | 2.1360E+01 | −6.5481E+01 | 1.2744E+02 |
| R6 | −1.0229E+01 | 6.8903E−01 | −6.4064E+00 | 2.5449E+01 | −6.3064E+01 | 1.0284E+02 |
| R7 | 9.9000E+01 | 9.5445E−01 | −3.2770E+00 | 6.6417E+00 | −8.6420E+00 | 7.3462E+00 |
| R8 | −2.1565E+00 | 7.3193E−01 | −1.4473E+00 | 1.7323E+00 | −8.4631E−01 | −1.6805E−01 |
| R9 | −9.0746E+00 | −4.0384E−01 | −6.5907E−03 | 4.5325E−01 | −4.4737E−01 | 2.1707E−01 |
| R10 | −4.9109E+00 | −2.8058E−01 | 2.8892E−01 | −2.2408E−01 | 1.3030E−01 | −5.3312E−02 |

|  | Cone coefficient | Aspherical coefficient | | | |
|---|---|---|---|---|---|
|  | k | A14 | A16 | A18 | A20 |
| R1 | −1.9185E+01 | 3.7704E+02 | −6.4006E+02 | 6.1356E+02 | −2.5423E+02 |
| R2 | −9.9000E+01 | 2.8743E+02 | −2.7232E+02 | 1.4295E+02 | −3.1688E+01 |
| R3 | −5.8001E−01 | 2.5906E+02 | −2.1857E+02 | 1.0588E+02 | −2.2587E+01 |
| R4 | −3.6144E+01 | 6.9869E+01 | −4.8206E+01 | 1.9031E+01 | −3.3483E+00 |

TABLE 10-continued

| | | | | |
|---|---|---|---|---|
| R5 | −9.9000E+01 | −1.5959E+02 | 1.2476E+02 | −5.5552E+01 | 1.0768E+01 |
| R6 | −1.0229E+01 | −1.1027E+02 | 7.4860E+01 | −2.9244E+01 | 5.0213E+00 |
| R7 | 9.9000E+01 | −3.9965E+00 | 1.2920E+00 | −2.1523E−01 | 1.3046E−02 |
| R8 | −2.1565E+00 | 3.6843E−01 | −1.6348E−01 | 3.2029E−02 | −2.4169E−03 |
| R9 | −9.0746E+00 | −6.0900E−02 | 1.0029E−02 | −9.0032E−04 | 3.3985E−05 |
| R10 | −4.9109E+00 | 1.4302E−02 | −2.3575E−03 | 2.1500E−04 | −8.2656E−06 |

Table 11 and Table 12 show the design data of the inflection point and the stagnation point of each lens in the camera optical lens 30.

TABLE 11

| | Number of inflection points | Inflection point position 1 | Inflection point position 2 | Inflection point position 3 |
|---|---|---|---|---|
| P1R1 | 0 | / | / | / |
| P1R2 | 0 | / | / | / |
| P2R1 | 3 | 0.195 | 0.695 | 0.865 |
| P2R2 | 3 | 0.495 | 0.655 | 0.865 |
| P3R1 | 3 | 0.325 | 0.455 | 0.575 |
| P3R2 | 2 | 0.315 | 1.045 | / |
| P4R1 | 3 | 0.865 | 1.345 | 1.465 |
| P4R2 | 2 | 0.415 | 1.045 | / |
| P5R1 | 3 | 0.205 | 1.035 | 2.055 |
| P5R2 | 3 | 0.445 | 2.225 | 2.375 |

TABLE 12

| | Number of stagnation points | Stagnation point position 1 | Stagnation point position 2 | Stagnation point position 3 |
|---|---|---|---|---|
| P1R1 | 0 | / | / | / |
| P1R2 | 0 | / | / | / |
| P2R1 | 1 | 0.345 | / | / |
| P2R2 | 1 | 0.955 | / | / |
| P3R1 | 1 | 0.725 | / | / |
| P3R2 | 1 | 0.515 | / | / |
| P4R1 | 1 | 1.085 | / | / |
| P4R2 | 2 | 0.865 | 1.165 | / |
| P5R1 | 3 | 0.345 | 2.025 | 2.075 |
| P5R2 | 1 | 1.295 | / | / |

In addition, the values corresponding to the various parameters and the parameters specified in the conditions in Embodiment 3 are listed in Table 21. It can be seen that, the camera optical lens according to this embodiment satisfies the above-mentioned condition.

Figure 10:
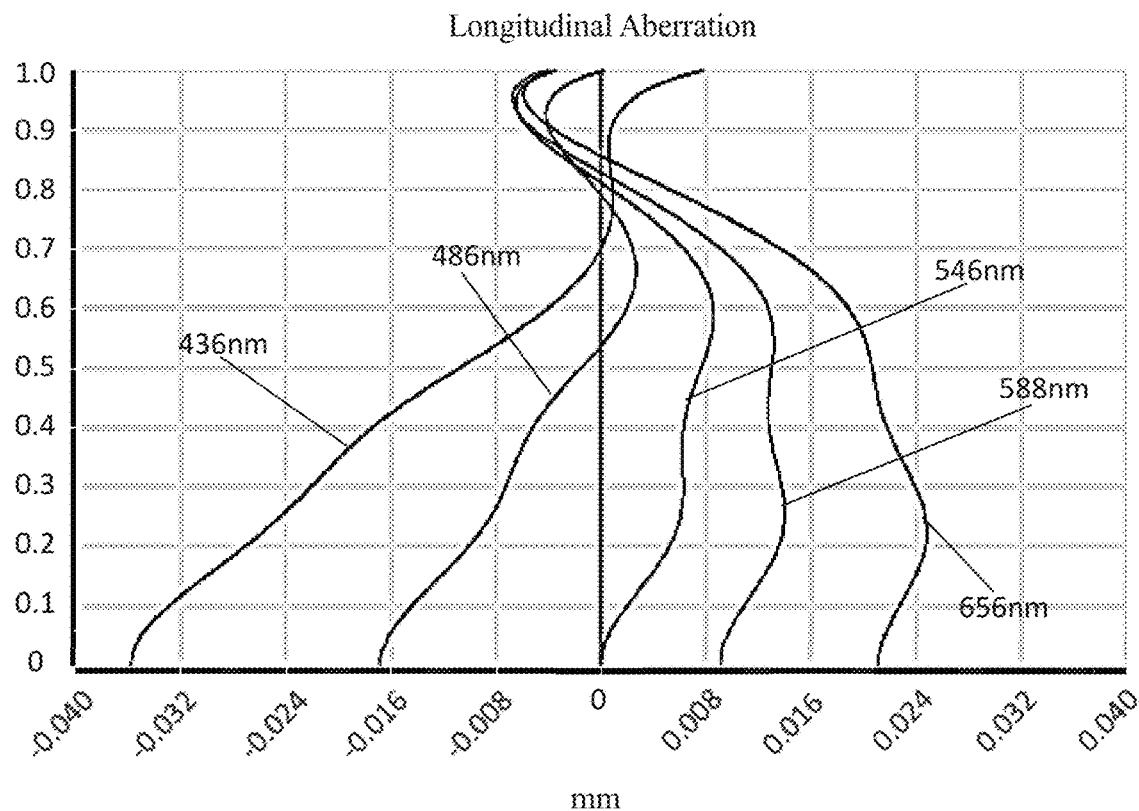
FIG. 10 is a schematic diagram of longitudinal aberration of the camera optical lens shown in FIG. 9.
Figure 11:
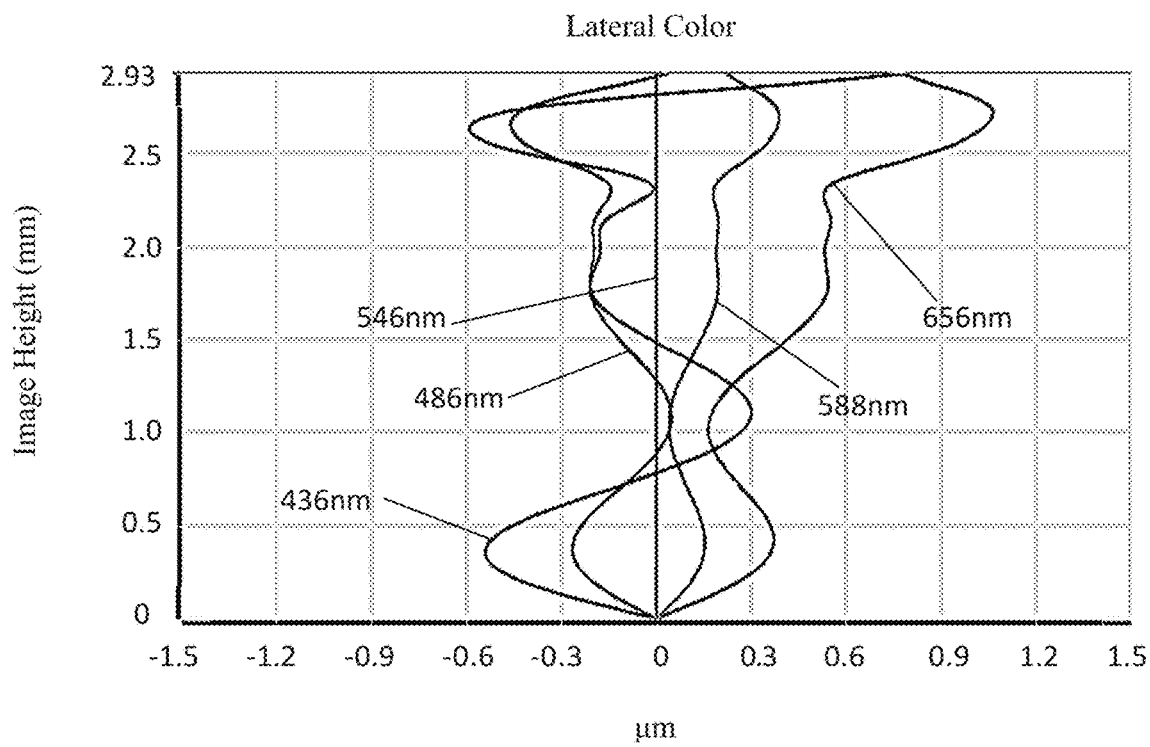
FIG. 11 is a schematic diagram of lateral color of the camera optical lens shown in FIG. 9.
Figure 12:
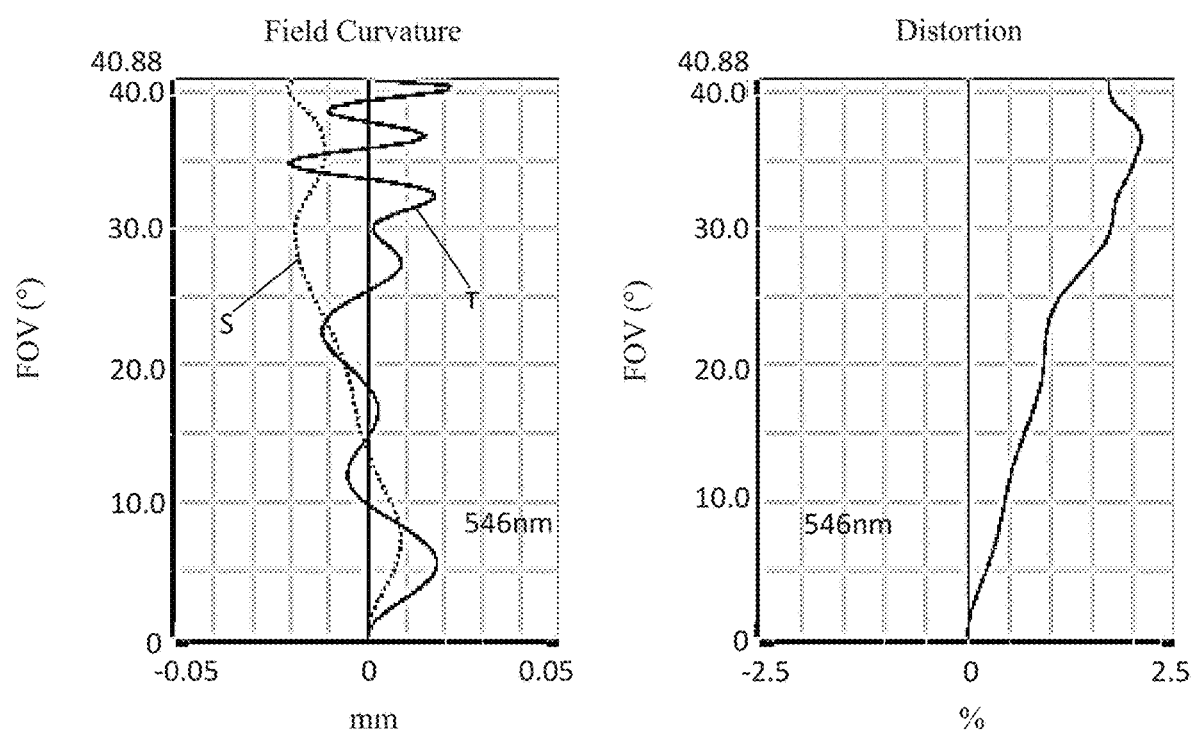
FIG. 12 is a schematic diagram of field curvature and distortion of the camera optical lens shown in FIG. 9.

FIG. 10 and FIG. 11 respectively show schematic diagrams of longitudinal aberration and lateral color of light having wavelengths of 656 nm, 588 nm, 546 nm, 486 nm and 436 nm after passing through the camera optical lens 30. FIG. 12 shows a schematic diagram of field curvature and distortion of light having a wavelength of 546 nm after passing through the camera optical lens 30. In FIG. 12, the field curvature S is the field curvature in a sagittal direction, and the field curvature T is the field curvature in a meridian direction.

In this embodiment, an entrance pupil diameter ENPD of the camera optical lens 30 is 1.326 mm, the full field of view image height IH is 2.930 mm, and the FOV in a diagonal direction is 81.75°, so that the camera optical lens 30 can meet the design requirements of a large aperture, a wide angle and ultra-thinness. The on-axis and off-axis color aberrations are fully corrected, and the camera optical lens 30 has excellent optical performance.

Embodiment 4

Figure 13:
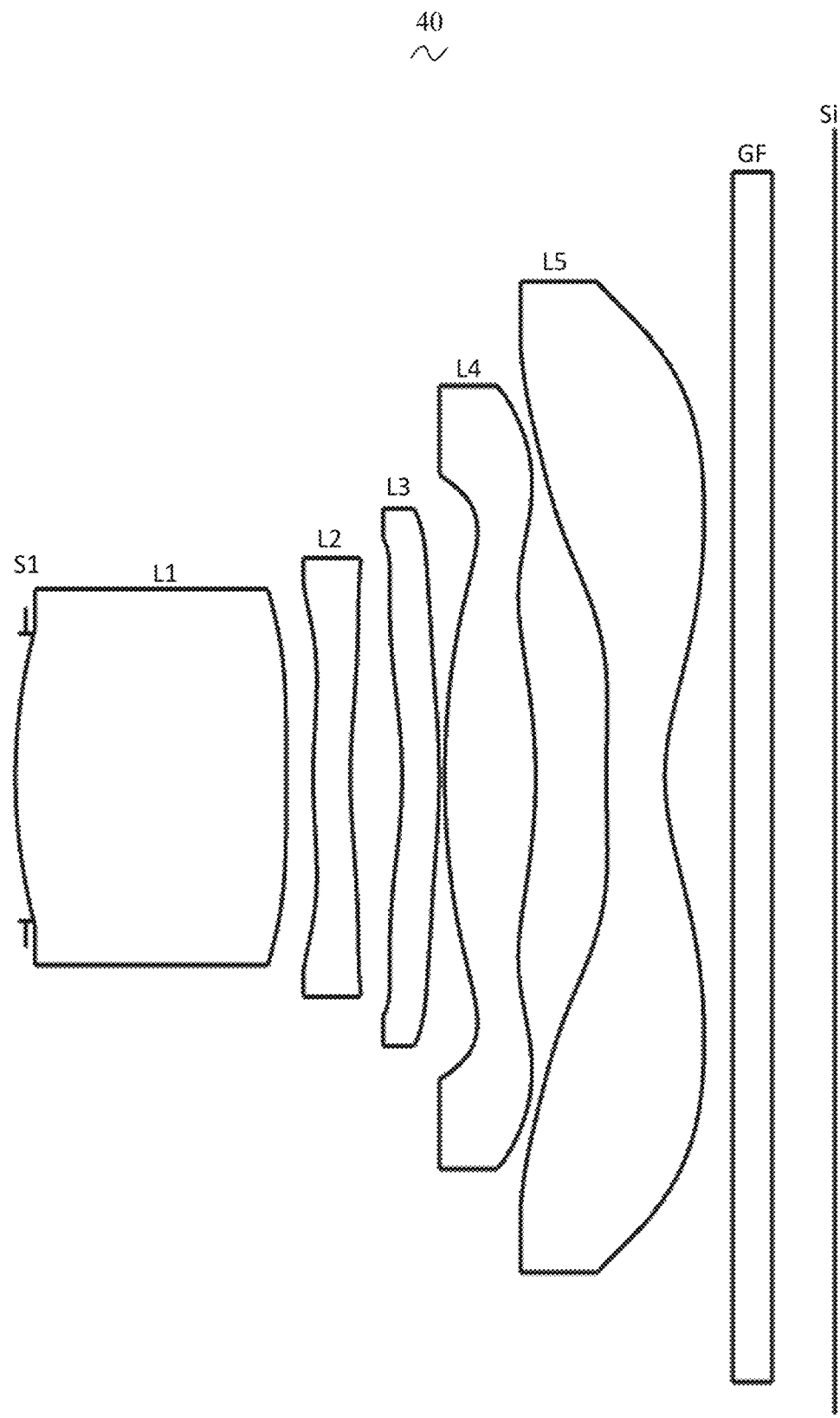
FIG. 13 is a schematic structural diagram of a camera optical lens according to Embodiment 4.

FIG. 13 is a schematic structural diagram of a camera optical lens 40 according to Embodiment 4. Embodiment 4 is basically the same as Embodiment 1. The representation of the symbols in the following tables is defined the same as that of Embodiment 1, the same part will not be repeated herein, and only the difference from Embodiment 1 is described in the following.

In this embodiment, the image side surface of the first lens L1 is a concave surface at a paraxial position.

In this embodiment, the object side surface of the second lens L2 is a convex surface at a paraxial position.

In this embodiment, the image side surface of the third lens L3 is a convex surface at a paraxial position.

Table 13 shows the design data of the camera optical lens 40 according to Embodiment 4 of the present invention.

TABLE 13

| | R | d | | nd | | vd |
|---|---|---|---|---|---|---|
| S1 | ∞ | d0= | −0.055 | | | |
| R1 | 2.136 | d1= | 1.453 | nd1 | 1.5444 | v1 | 55.82 |
| R2 | 19.709 | d2= | 0.145 | | | |
| R3 | 1.951 | d3= | 0.200 | nd2 | 1.6700 | v2 | 19.39 |
| R4 | 1.853 | d4= | 0.277 | | | |
| R5 | −2.180 | d5= | 0.200 | nd3 | 1.6700 | v3 | 19.39 |
| R6 | −3.115 | d6= | 0.030 | | | |
| R7 | 3.482 | d7= | 0.488 | nd4 | 1.5444 | v4 | 55.82 |
| R8 | −1.952 | d8= | 0.379 | | | |
| R9 | 4.324 | d9= | 0.315 | nd5 | 1.5346 | v5 | 55.69 |
| R10 | 0.858 | d10= | 0.364 | | | |
| R11 | ∞ | d11= | 0.210 | ndg | 1.5168 | vg | 64.17 |
| R12 | ∞ | d12= | 0.338 | | | |

Table 14 shows the aspherical surface data of the lenses in the camera optical lens 40 according to Embodiment 4 of the present invention.

TABLE 14

| | Cone coefficient | Aspherical coefficient | | | | |
|---|---|---|---|---|---|---|
| | k | A4 | A6 | A8 | A10 | A12 |
| R1 | −1.2247E+01 | 9.7552E−02 | 6.2937E−01 | −9.6447E+00 | 7.4553E+01 | −3.5823E+02 |
| R2 | 4.7361E+02 | −6.4170E−01 | 3.6662E+00 | −2.2413E+01 | 9.2395E+01 | −2.5516E+02 |

TABLE 14-continued

| | | | | | |
|---|---|---|---|---|---|
| R3 | −9.9000E+01 | −1.2014E−01 | −9.9078E−01 | 2.9379E+00 | −5.1927E+00 | 1.7152E−01 |
| R4 | −9.8790E+01 | 6.6436E−02 | −8.0274E−01 | 2.7960E+00 | −6.7720E+00 | 1.1163E+01 |
| R5 | −1.3733E+01 | −5.4504E−01 | 5.4832E+00 | −2.1579E+00 | 5.2118E+01 | −8.2792E+01 |
| R6 | −2.3973E+01 | −1.9557E−01 | 1.9805E+00 | −5.1590E+00 | 5.1194E+00 | 9.4201E−01 |
| R7 | −6.4085E+00 | 1.6978E−01 | −1.0057E+00 | 3.6857E+00 | −7.6347E+00 | 9.5976E+00 |
| R8 | −9.2366E−02 | 3.7504E−01 | −1.2052E+00 | 2.8921E+00 | −3.4123E+00 | 2.2620E+00 |
| R9 | −1.5000E+02 | −3.9758E−01 | −3.1943E−02 | 4.4211E−01 | −3.6734E−01 | 1.4434E−01 |
| R10 | −5.0232E+00 | −2.5077E−01 | 2.2969E−01 | −1.8174E−01 | 1.1588E−01 | −5.1794E−02 |

| | Cone coefficient | Aspherical coefficient | | | |
|---|---|---|---|---|---|
| | k | A14 | A16 | A18 | A20 |
| R1 | −1.2247E+01 | 1.0848E+03 | −2.0091E+03 | 2.0768E+03 | −9.1756E+02 |
| R2 | 4.7361E+02 | 4.6583E+02 | −5.3552E+02 | 3.4926E+02 | −9.8199E+01 |
| R3 | −9.9000E+01 | 2.4599E+01 | −5.0459E+01 | 4.1541E+01 | −1.2639E+01 |
| R4 | −9.8790E+01 | −1.1566E+01 | 7.3503E+00 | −2.7747E+00 | 5.1404E−01 |
| R5 | −1.3733E+01 | 8.7151E+01 | −5.8756E+01 | 2.3012E+01 | −3.9873E+00 |
| R6 | −2.3673E+01 | −6.8101E+00 | 6.3539E+00 | −2.6042E+00 | 4.1474E−01 |
| R7 | −6.4085E+00 | −7.5350E+00 | 3.5991E+00 | −9.5734E−01 | 1.0879E+01 |
| R8 | −9.2366E−02 | −8.9831E−01 | 2.1297E−01 | −2.7832E−02 | 1.5428E−03 |
| R9 | −1.5000E+02 | −3.0686E−02 | 3.3659E−03 | −1.3990E−04 | −1.5102E−06 |
| R10 | −5.0232E+00 | 1.4835E−02 | −2.5743E−03 | 2.4597E−04 | −9.91435E−06 |

Table 15 and Table 16 show the design data of the inflection point and the stagnation point of each lens in the camera optical lens 40.

TABLE 15

| | Number of inflection points | Inflection point position 1 | Inflection point position 2 | Inflection point position 3 | Inflection point position 4 | Inflection point position 5 |
|---|---|---|---|---|---|---|
| P1R1 | 0 | / | / | / | / | / |
| P1R2 | 1 | 0.095 | / | / | / | / |
| P2R1 | 2 | 0.235 | 0.765 | / | / | / |
| P2R2 | 2 | 0.335 | 0.755 | / | / | / |
| P3R1 | 2 | 0.375 | 0.865 | / | / | / |
| P3R2 | 5 | 0.375 | 0.625 | 0.825 | 0.885 | 1.215 |
| P4R1 | 2 | 0.885 | 1.375 | / | / | / |
| P4R2 | 2 | 0.545 | 1.085 | / | / | / |
| P5R1 | 3 | 0.185 | 0.965 | 2.025 | / | / |
| P5R2 | 3 | 0.445 | 2.155 | 2.295 | / | / |

TABLE 16

| | Number of stagnation points | Stagnation point position 1 | Stagnation point position 2 |
|---|---|---|---|
| P1R1 | 0 | / | / |
| P1R2 | 1 | 0.155 | / |
| P2R1 | 1 | 0.445 | / |
| P2R2 | 0 | / | / |
| P3R1 | 2 | 0.815 | 0.895 |
| P3R2 | 0 | / | / |
| P4R1 | 1 | 1.115 | / |
| P4R2 | 2 | 0.825 | 1.335 |
| P5R1 | 1 | 0.325 | / |
| P5R2 | 1 | 1.195 | / |

In addition, the values corresponding to the various parameters and the parameters specified in the conditions in Embodiment 4 are listed in Table 21. It can be seen that, the camera optical lens according to this embodiment satisfies the above-mentioned conditions.

Figure 14:
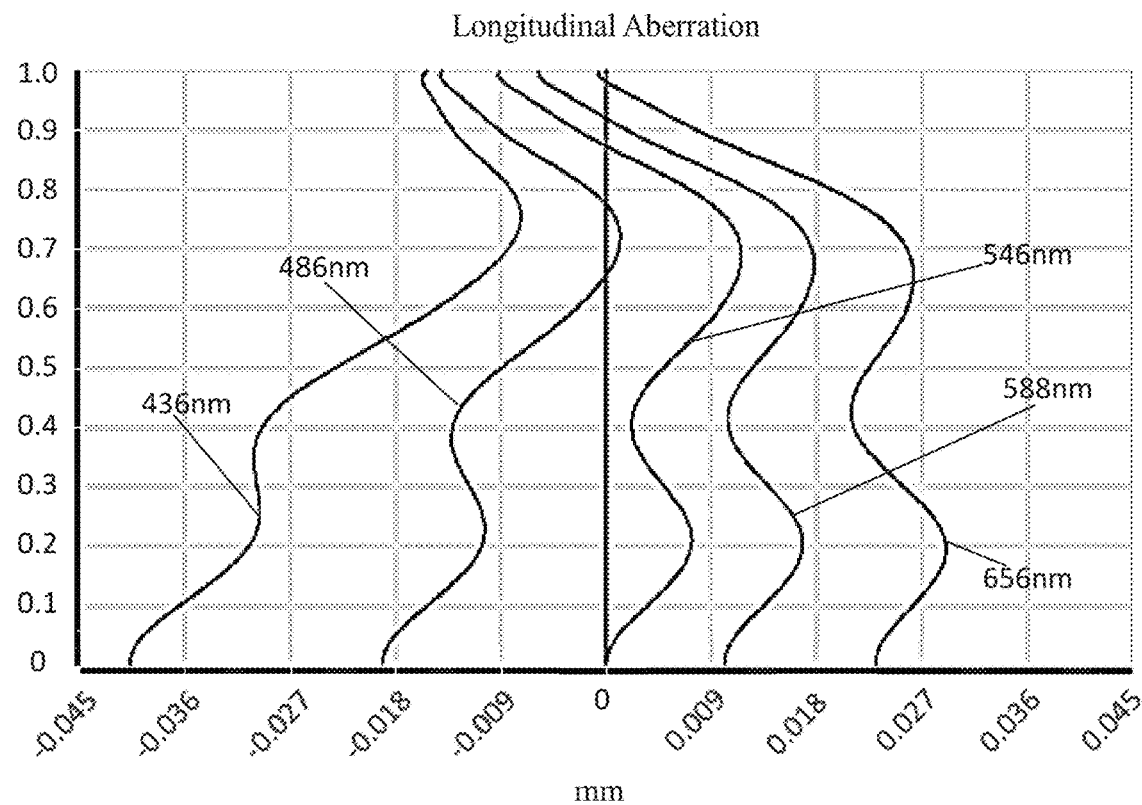
FIG. 14 is a schematic diagram of longitudinal aberration of the camera optical lens shown in FIG. 13.
Figure 15:
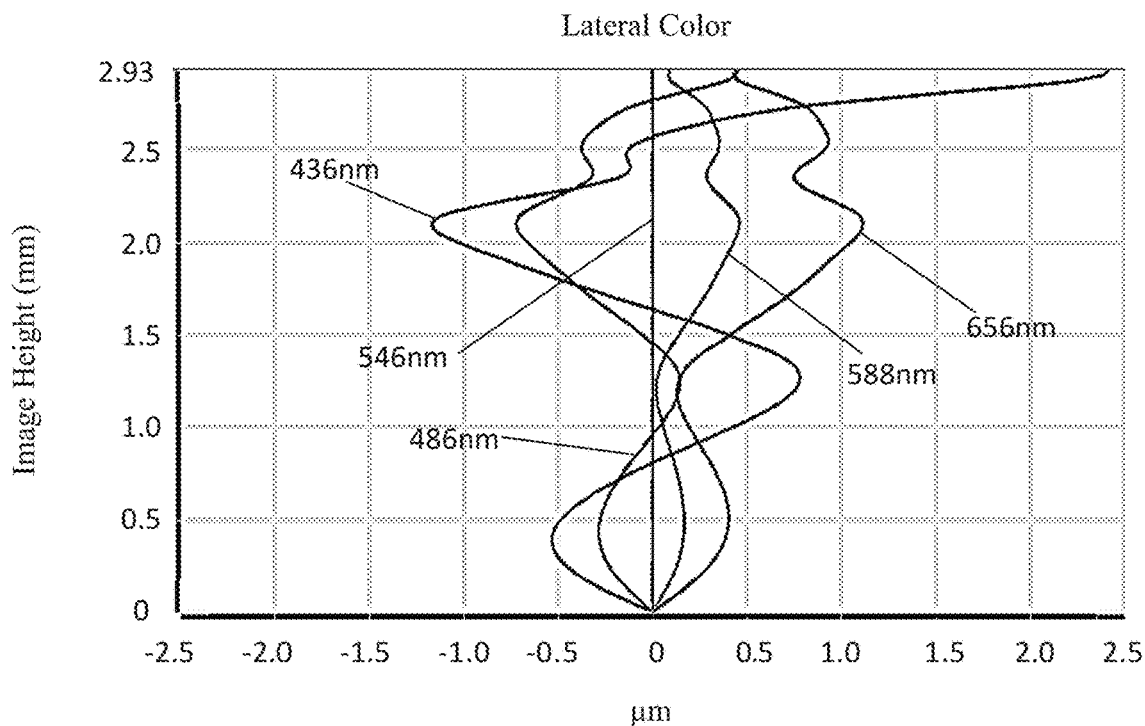
FIG. 15 is a schematic diagram of lateral color of the camera optical lens shown in FIG. 13.
Figure 16:
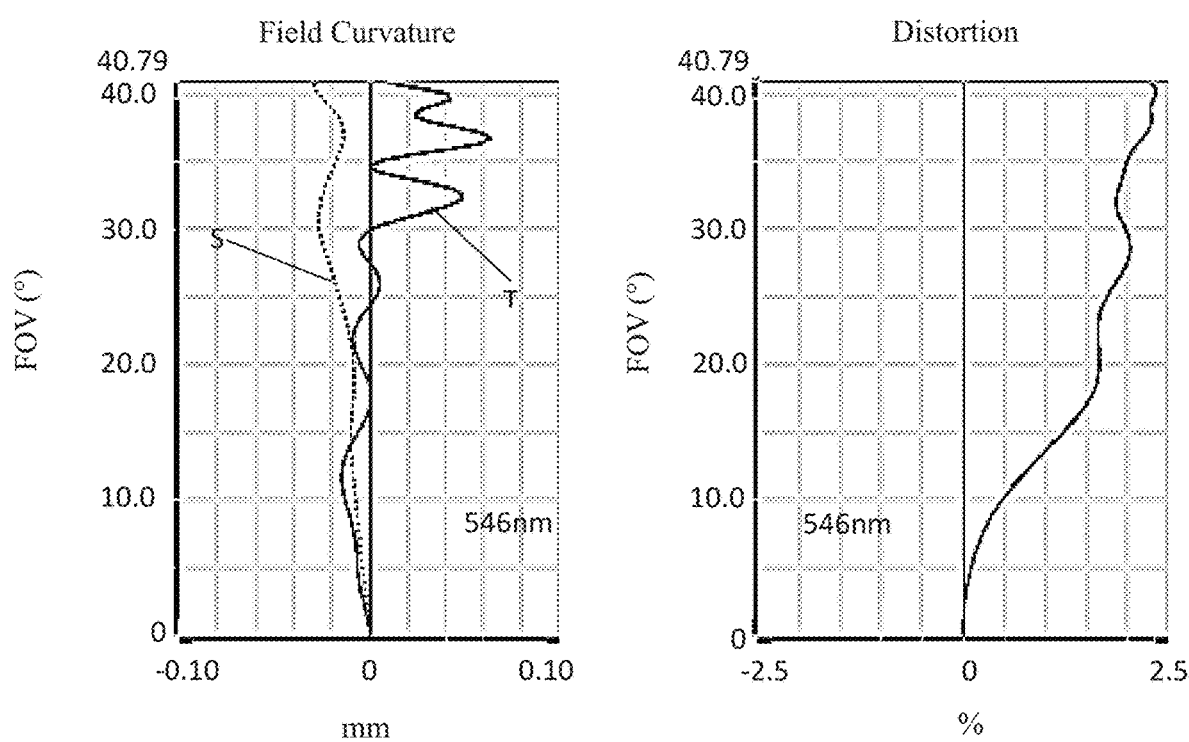
FIG. 16 is a schematic diagram of field curvature and distortion of the camera optical lens shown in FIG. 13.

FIG. 14 and FIG. 15 respectively show schematic diagrams of longitudinal aberration and lateral color of light having wavelengths of 656 nm, 588 nm, 546 nm, 486 nm and 436 nm after passing through the camera optical lens 40. FIG. 16 shows a schematic diagram of field curvature and distortion of light having a wavelength of 546 nm after passing through the camera optical lens 40. In FIG. 16, the field curvature S is the field curvature in a sagittal direction, and the field curvature T is the field curvature in a meridian direction.

In this embodiment, an entrance pupil diameter ENPD of the camera optical lens 40 is 1.359 mm, the full field of view image height IH is 2.930 mm, and the FOV in a diagonal direction is 81.57°, so that the camera optical lens 40 can meet the design requirements of a large aperture, a wide angle and ultra-thinness. The on-axis and off-axis color aberrations are fully corrected, and the camera optical lens 40 has excellent optical performance.

Embodiment 5

Figure 17:
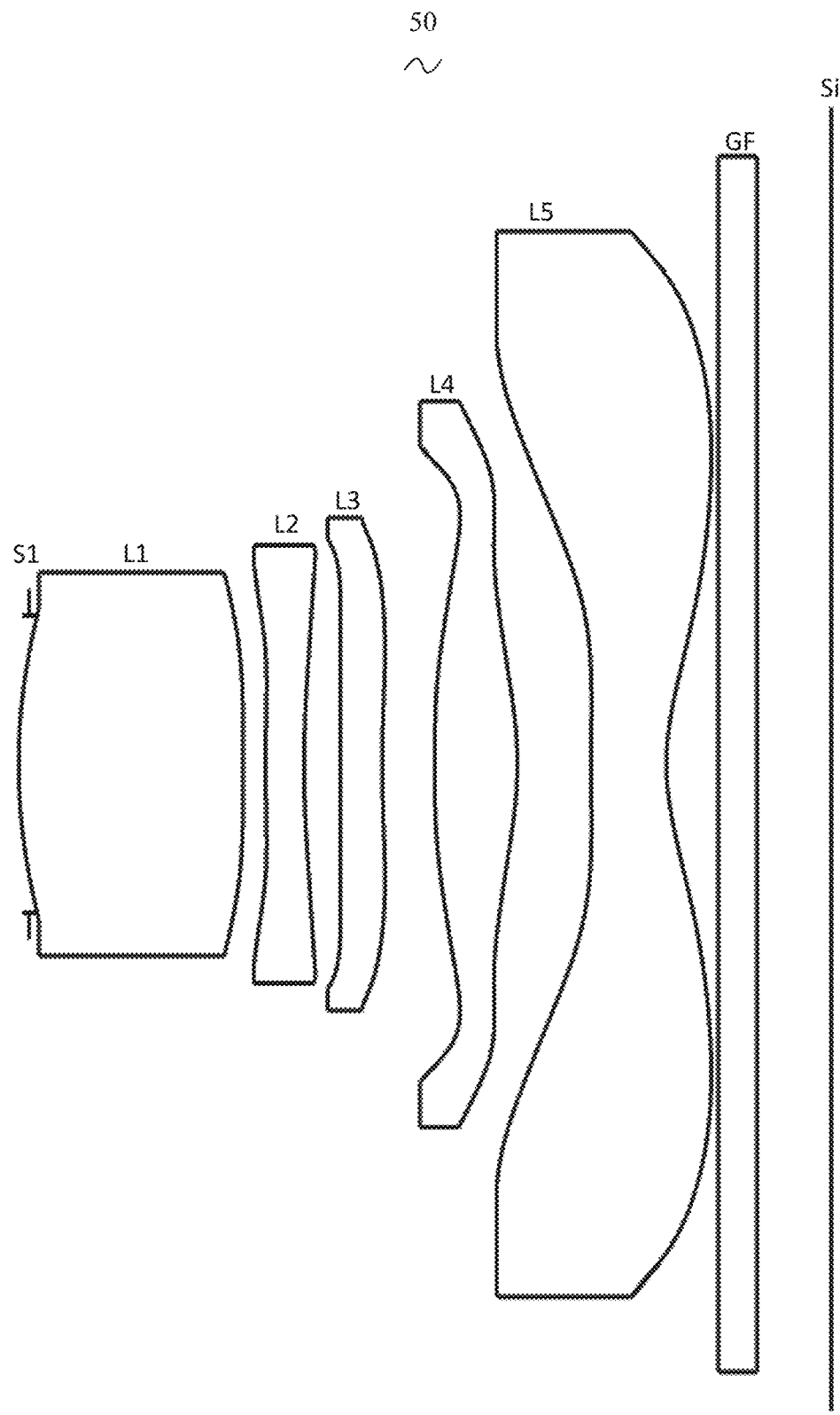
FIG. 17 is a schematic structural diagram of a camera optical lens according to Embodiment 5.

FIG. 17 is a schematic structural diagram of a camera optical lens 50 according to Embodiment 5. Embodiment 5 is basically the same as Embodiment 1. The representation of the symbols in the following tables is defined the same as that of Embodiment 1, the same part will not be repeated herein, and only the difference from Embodiment 1 is described in the following.

In this embodiment, the object side surface of the second lens L2 is a convex surface at a paraxial position.

In this embodiment, the object side surface of the third lens L3 is a convex surface at a paraxial position.

Table 17 shows the design data of the camera optical lens 50 according to Embodiment 5 of the present invention.

TABLE 17

|     | R        |      |         | nd     |    | vd    |
|-----|----------|------|---------|--------|----|-------|
| S1  | ∞        | d0=  | -0.058  |        |    |       |
| R1  | 2.136    | d1=  | 1.217   | nd1    | 1.5346 | v1 | 55.69 |
| R2  | -763.153 | d2=  | 0.121   |        |    |       |
| R3  | 5.056    | d3=  | 0.209   | nd2    | 1.6701 | v2 | 19.39 |
| R4  | 4.114    | d4=  | 0.196   |        |    |       |
| R5  | 188.592  | d5=  | 0.229   | nd3    | 1.6319 | v3 | 23.20 |
| R6  | 8.894    | d6=  | 0.284   |        |    |       |
| R7  | 20.696   | d7=  | 0.448   | nd4    | 1.5352 | v4 | 55.17 |
| R8  | -1.277   | d8=  | 0.399   |        |    |       |
| R9  | 10.761   | d9=  | 0.408   | nd5    | 1.5377 | v5 | 62.87 |
| R10 | 0.897    | d10= | 0.283   |        |    |       |
| R11 | ∞        | d11= | 0.210   | ndg    | 1.5168 | vg | 64.17 |
| R12 | ∞        | d12= | 0.403   |        |    |       |

Table 18 shows the aspherical surface data of the lenses in the camera optical lens 50 according to Embodiment 5 of the present invention.

TABLE 18

|     | Cone coefficient | Aspherical coefficient | | | | |
|-----|---------|-------------|-------------|-------------|-------------|-------------|
|     | k       | A4          | A6          | A8          | A10         | A12         |
| R1  | -1.8024E+01 | 1.9346E-01  | -7.2933E-02 | -3.0231E+00 | 2.6621E+01  | -1.3155E+02 |
| R2  | 1.0000E+03  | -4.4950E-01 | 1.9738E+00  | -1.3417E+01 | 5.6685E+01  | -1.4553E+02 |
| R3  | -5.7123E+01 | -5.3820E-01 | 2.8309E+00  | -1.8454E+01 | 6.5950E+01  | -1.3670E+02 |
| R4  | -4.1169E+01 | -9.0229E-02 | 1.2413E+00  | -7.4988E+00 | 2.1990E+01  | -3.6314E+01 |
| R5  | -1.0000E+03 | 4.0297E-01  | -4.2298E+00 | 2.1534E+01  | -6.5647E+01 | 1.2790E+02  |
| R6  | -8.4594E+00 | 6.1825E-01  | -5.6705E+00 | 2.1712E+01  | -5.1765E+01 | 8.1578E+01  |
| R7  | -1.5000E+02 | 8.3152E-02  | -2.6521E+00 | 4.9062E+00  | -5.8717E+00 | 4.6654E+00  |
| R8  | -1.9010E+00 | 6.4215E-01  | -9.7491E-01 | 6.2493E-01  | 4.1015E-01  | -9.2226E-01 |
| R9  | 4.1509E-01  | -3.0450E-01 | -2.4266E-02 | 2.9001E-01  | -2.4826E-01 | 1.0607E-01  |
| R10 | -4.9964E+00 | -2.3889E-01 | 2.4134E-01  | -1.8115E-01 | 9.7927E-02  | -3.6424E-02 |

|     | Cone coefficient | Aspherical coefficient | | | |
|-----|---------|-------------|-------------|-------------|-------------|
|     | k       | A14         | A16         | A18         | A20         |
| R1  | -1.8024E+01 | 4.0403E+02  | -7.5569E+02 | 7.8595E+02  | -3.4818E+02 |
| R2  | 1.0000E+03  | 2.3342E+02  | -2.2756E+02 | 1.2243E+02  | -2.7694E+01 |
| R3  | -5.7123E+01 | 1.7425E+02  | -1.3456E+02 | 5.7193E+01  | -1.0129E+01 |
| R4  | -4.1169E+01 | 3.5157E+01  | -1.9073E+01 | 4.8868E+00  | -3.3157E-01 |
| R5  | -1.0000E+03 | -1.6164E+02 | 1.2850E+02  | -5.8560E+01 | 1.1675E+01  |
| R6  | -8.4594E+00 | -8.5160E+01 | 5.6705E+01  | -2.1863E+01 | 3.7239E+00  |
| R7  | -1.5000E+02 | -2.4092E+00 | 7.4654E+00  | -1.2006E+01 | 7.1511E-03  |
| R8  | -1.9010E+00 | 6.0838E-01  | -1.9804E-01 | 3.2359E-02  | -2.1174E-03 |
| R9  | 4.1509E-01  | -2.6090E-02 | 3.7186E-03  | -2.8330E-04 | 8.8161E-06  |
| R10 | -4.9964E+00 | 8.8491E-03  | -1.3238E-03 | 1.0984E-04  | -3.8487E-06 |

Table 19 and Table 20 show the design data of the inflection point and the stagnation point of each lens in the camera optical lens 50.

TABLE 19

|      | Number of inflection points | Inflection point position 1 | Inflection point position 2 | Inflection point position 3 |
|------|---|-------|-------|-------|
| P1R1 | 0 | /     | /     | /     |
| P1R2 | 0 | /     | /     | /     |
| P2R1 | 3 | 0.205 | 0.705 | 0.855 |
| P2R2 | 3 | 0.475 | 0.665 | 0.835 |
| P3R1 | 1 | 0.295 | /     | /     |
| P3R2 | 2 | 0.315 | 1.045 | /     |
| P4R1 | 2 | 0.875 | 1.365 | /     |
| P4R2 | 3 | 0.445 | 1.065 | 1.635 |// TABLE 19-continued
| P5R1 | 2 | 0.165 | 1.165 | /     |
| P5R2 | 2 | 0.475 | 2.315 | /     |

TABLE 20

|      | Number of stagnation points | Stagnation point position 1 | Stagnation point position 2 |
|------|---|-------|-------|
| P1R1 | 0 | /     | /     |
| P1R2 | 0 | /     | /     |
| P2R1 | 1 | 0.355 | /     |
| P2R2 | 1 | 0.945 | /     |
| P3R1 | 1 | 0.595 | /     |
| P3R2 | 1 | 0.515 | /     |
| P4R1 | 1 | 1.105 | /     |// TABLE 20-continued
| P4R2 | 2 | 0.975 | 1.135 |
| P5R1 | 1 | 0.275 | /     |
| P5R2 | 1 | 1.385 | /     |

The values corresponding to the various parameters and the parameters specified in the conditions in Embodiment 5 are listed in Table 21. It can be seen that the camera optical lens according to this embodiment satisfies the above-mentioned conditions.

Figure 18:
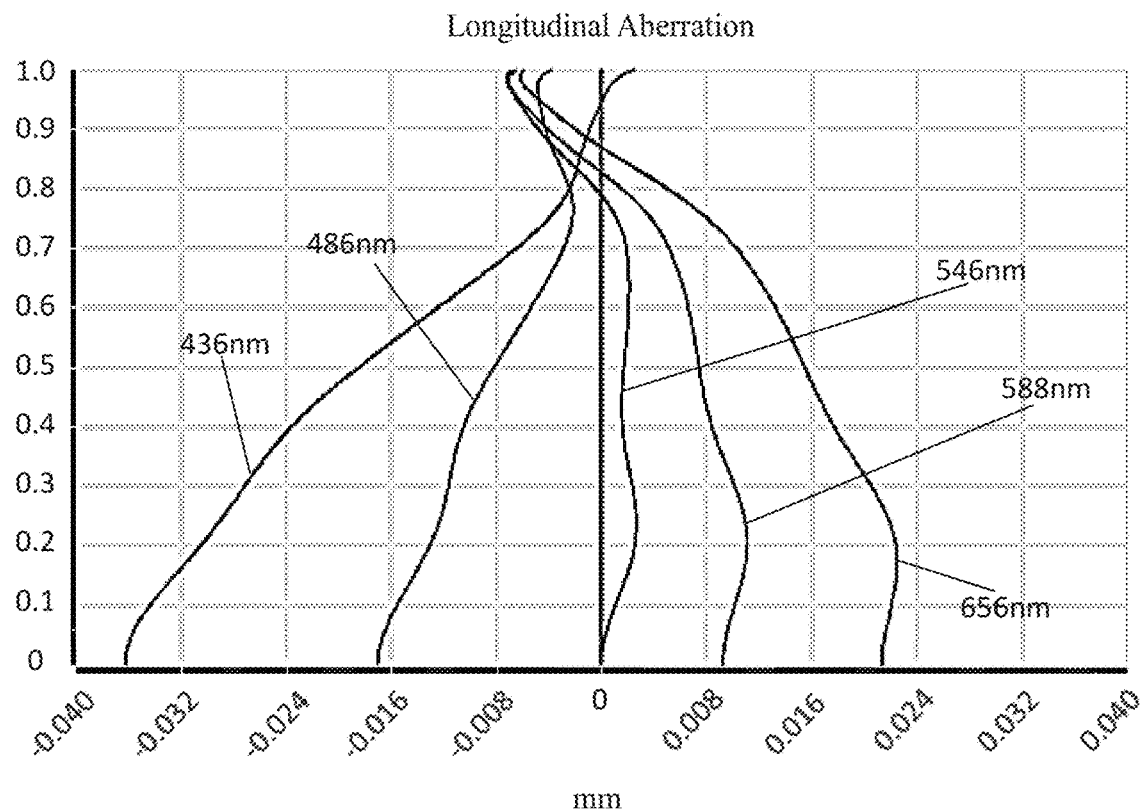
FIG. 18 is a schematic diagram of longitudinal aberration of the camera optical lens shown in FIG. 17.
Figure 19:
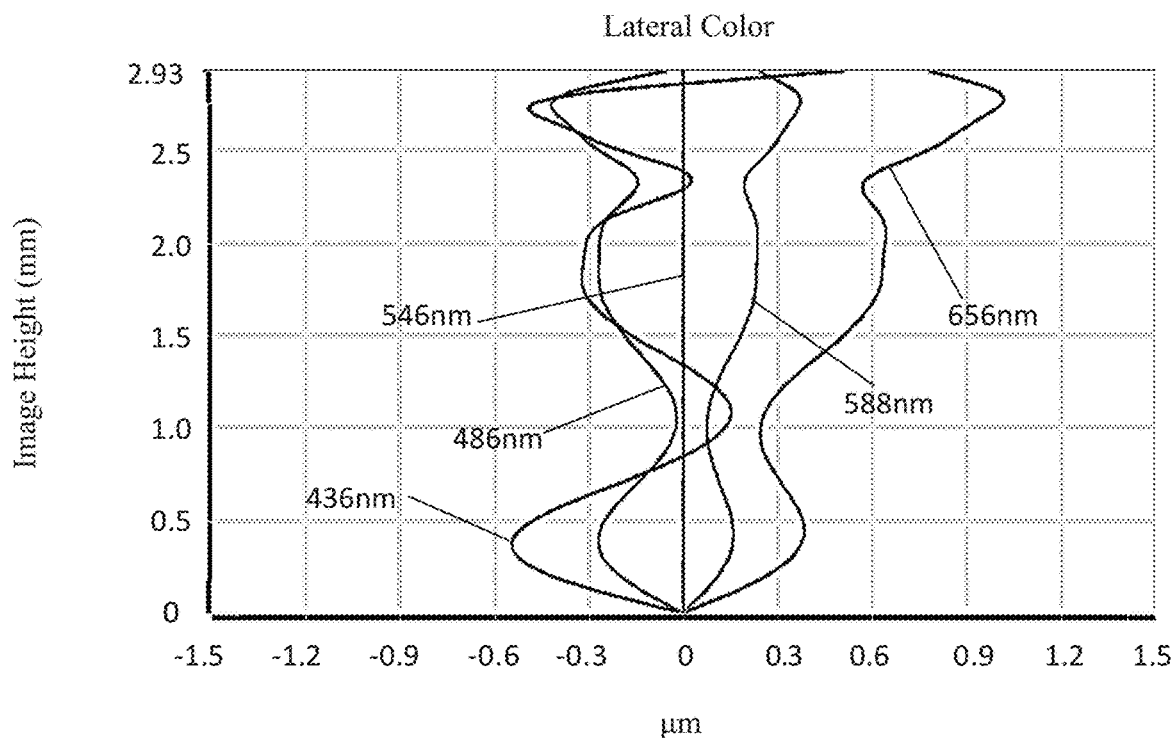
FIG. 19 is a schematic diagram of lateral color of the camera optical lens shown in FIG. 17.
Figure 20:
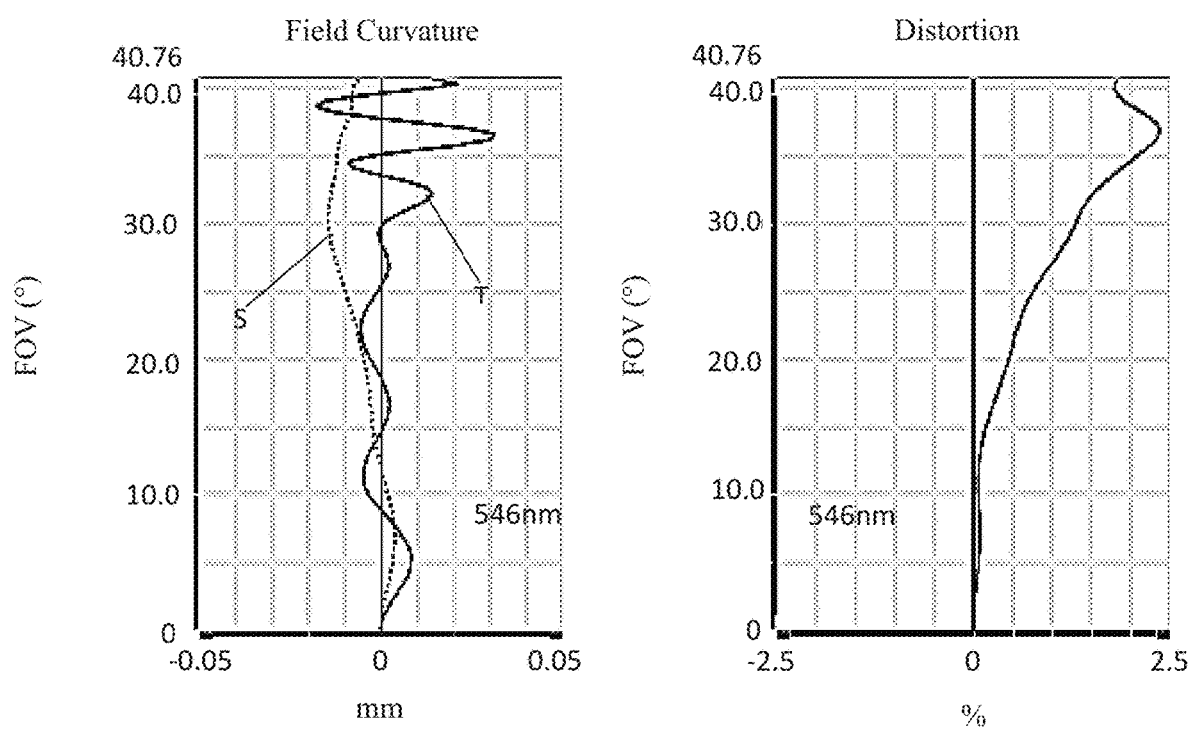
FIG. 20 is a schematic diagram of field curvature and distortion of the camera optical lens shown in FIG. 17.

FIG. 18 and FIG. 19 respectively show schematic diagrams of longitudinal aberration and lateral color of light having wavelengths of 656 nm, 588 nm, 546 nm, 486 nm and 436 nm after passing through the camera optical lens 50. FIG. 20 shows a schematic diagram of field curvature and distortion of light having a wavelength of 546 nm after passing through the camera optical lens 50. In FIG. 20, the field curvature S is the field curvature in a sagittal direction, and the field curvature T is the field curvature in a meridian direction.

In this embodiment, an entrance pupil diameter ENPD of the camera optical lens 50 is 1.359 mm, the full field of view image height IH is 2.930 mm, and the FOV in a diagonal direction is 81.510, so that the camera optical lens 50 can meet the design requirements of a large aperture, a wide angle and ultra-thinness. The on-axis and off-axis color aberrations are fully corrected, and the camera optical lens 50 has excellent optical performance.

TABLE 21

| Parameters & conditions | Embodiment 1 | Embodiment 2 | Embodiment 3 | Embodiment 4 | Embodiment 5 |
|---|---|---|---|---|---|
| f1/f | 1.01 | 0.90 | 1.20 | 1.30 | 1.20 |
| f3/f | −3.32 | −2.50 | −5.00 | −3.58 | −4.44 |
| d1/d2 | 21.40 | 24.54 | 10.06 | 10.02 | 10.06 |
| (R7 + R8)/(R7 − R8) | 0.01 | 0.00 | 0.90 | 0.28 | 0.88 |
| f | 3.266 | 3.304 | 3.287 | 3.276 | 3.294 |
| f1 | 3.295 | 2.976 | 3.945 | 4.257 | 3.969 |
| f2 | −9.261 | −9.318 | −27.528 | −300.054 | −35.791 |
| f3 | −10.840 | −8.262 | −16.426 | −11.728 | −14.631 |
| f4 | 2.165 | 2.717 | 2.284 | 2.362 | 2.254 |
| f5 | −2.131 | −2.623 | −1.982 | −2.059 | −1.838 |
| f12 | 4.451 | 3.898 | 4.334 | 4.120 | 4.244 |
| FNO | 2.48 | 2.48 | 2.48 | 2.41 | 2.42 |
| FOV | 82.38* | 82.00* | 81.75* | 81.57* | 81.51* |
| TTL | 4.370 | 4.370 | 4.375 | 4.399 | 4.407 |
| IH | 2.930 | 2.930 | 2.930 | 2.930 | 2.930 |

FNO: an F number (a ratio of an effective focal length of the camera optical lens to an entrance pupil diameter).

The above description merely illustrates some embodiments of the present invention. It should be noted that those skilled in the art may make improvements without departing from a creative concept of the present invention, and all these improvements shall fall into a protection scope of the present invention.

What is claimed is:

1. A camera optical lens, comprising, from an object side to an image side:
   a first lens having a positive refractive power;
   a second lens having a negative refractive power;
   a third lens having a negative refractive power;
   a fourth lens having a positive refractive power; and
   a fifth lens having a negative refractive power,
   wherein the camera optical lens satisfies following conditions:

$0.90 \leq f1/f \leq 1.30;$ $-5.00 \leq f3/f \leq -2.50;$ $10.00 \leq d1/d2 \leq 25.00;$ and $0 \leq (R7+R8)/(R7-R8) \leq 0.90,$ where f denotes a focal length of the camera optical lens, f1 denotes a focal length of the first lens, f3 denotes a focal length of the third lens, R7 denotes a curvature radius of an object side surface of the fourth lens, R8 denotes a curvature radius of an image side surface of the fourth lens, d1 denotes an on-axis thickness of the first lens, and d2 denotes an on-axis distance from an image side surface of the first lens to an object side surface of the second lens.

2. The camera optical lens as described in claim 1, further satisfying a following condition:

$2.00 \leq R9/R10 \leq 12.00,$ where R9 denotes a curvature radius of an object side surface of the fifth lens, and R10 denotes a curvature radius of an image side surface of the fifth lens.

3. The camera optical lens as described in claim 1, further satisfying following conditions:

$-2.49 \leq (R1+R2)/(R1-R2) \leq -0.40;$ and $0.14 \leq d1/TTL \leq 0.50,$ where R1 denotes a curvature radius of an object side surface of the first lens, R2 denotes a curvature radius of the image side surface of the first lens, and TTL denotes a total optical length from the object side surface of the first lens to an image plane of the camera optical lens along an optic axis.

4. The camera optical lens as described in claim 1, further satisfying following conditions:

$-183.18 \leq f2/f \leq -1.88;$ $-0.18 \leq (R3+R4)/(R3-R4) \leq 58.22;$ and $0.02 \leq d3/TTL \leq 0.08,$ where f2 denotes a focal length of the second lens, R3 denotes a curvature radius of the object side surface of the second lens, R4 denotes a curvature radius of an image side surface of the second lens, d3 denotes an on-axis thickness of the second lens, and TTL denotes a total optical length from an object side surface of the first lens to an image plane of the camera optical lens along an optic axis.

5. The camera optical lens as described in claim 1, further satisfying following conditions:

$-11.33 \leq (R5+R6)/(R5-R6) \leq 2.23;$ and $0.02 \leq d5/TTL \leq 0.09,$ where R5 denotes a curvature radius of an object side surface of the third lens, R6 denotes a curvature radius of an image side surface of the third lens, d5 denotes an on-axis thickness of the third lens, and TTL denotes a total optical length from an object side surface of the first lens to an image plane of the camera optical lens along an optic axis.

6. The camera optical lens as described in claim 1, further satisfying following conditions:

$0.33 \leq f4/f \leq 1.23;$ and $0.05 \leq d7/TTL \leq 0.22,$ where f4 denotes a focal length of the fourth lens, d7 denotes an on-axis thickness of the fourth lens, and TTL denotes a total optical length from an object side surface of the first lens to an image plane of the camera optical lens along an optic axis.

7. The camera optical lens as described in claim 1, further satisfying following conditions:

$-1.59 \leq f5/f \leq -0.37;$ $0.59 \leq (R9+R10)/(R9-R10) \leq 4.49;$ and $0.04 \leq d9/TTL \leq 0.14,$ where f5 denotes a focal length of the fifth lens, R9 denotes a curvature radius of an object side surface of the fifth lens, R10 denotes a curvature radius of an image side surface of the fifth lens, d9 denotes an on-axis thickness of the fifth lens, and TTL denotes a total optical length from an object side surface of the first lens to an image plane of the camera optical lens along an optic axis.

8. The camera optical lens as described in claim 1, further satisfying a following condition:

$TTL/IH \leq 1.51$, where IH denotes an image height of the camera optical lens, and TTL denotes a total optical length from an object side surface of the first lens to an image plane of the camera optical lens along an optic axis.

9. The camera optical lens as described in claim 1, further satisfying a following condition:

$FOV \geq 81.00°$, where FOV denotes a field of view of the camera optical lens.

10. The camera optical lens as described in claim 1, further satisfying a following condition:

$0.59 \leq f12/f \leq 2.04$, where f12 denotes a combined focal length of the first lens and the second lens.

\* \* \* \* \*